(12) United States Patent
Yoshida

(10) Patent No.: US 8,867,103 B2
(45) Date of Patent: Oct. 21, 2014

(54) IMAGE PROCESSING APPARATUS CAPABLE OF TRANSMITTING IMAGE DATA USING ANY ONE OF A PLURALITY OF COMMUNICATION PROTOCOLS

(75) Inventor: Hiroyoshi Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 285 days.

(21) Appl. No.: 12/885,927

(22) Filed: Sep. 20, 2010

(65) Prior Publication Data
US 2011/0069356 A1 Mar. 24, 2011

(30) Foreign Application Priority Data
Sep. 24, 2009 (JP) ................. 2009-219766

(51) Int. Cl.
 H04N 1/32 (2006.01)
 H04N 1/00 (2006.01)
 H04N 1/327 (2006.01)
(52) U.S. Cl.
 CPC ......... *H04N 1/0035* (2013.01); *H04N 1/00482* (2013.01); *H04N 2201/0094* (2013.01); *H04N 1/00217* (2013.01); *H04N 1/00472* (2013.01); *H04N 1/00408* (2013.01); *H04N 1/32058* (2013.01); *H04N 1/00214* (2013.01); *H04N 1/32797* (2013.01)
 USPC ........... 358/442; 358/1.9; 358/1.15; 709/230; 709/238; 709/239
(58) Field of Classification Search
 USPC .......................................... 358/1.1–3.29, 442
 See application file for complete search history.

(56) References Cited

U.S. PATENT DOCUMENTS

| 6,715,003 | B1* | 3/2004 | Safai ............................... 710/33 |
| 2002/0052974 | A1* | 5/2002 | Saito ............................. 709/247 |
| 2008/0222256 | A1* | 9/2008 | Rosenberg et al. ........... 709/206 |

FOREIGN PATENT DOCUMENTS

| JP | 2000-224357 A | 8/2000 |
| JP | 2003-016003 A | 1/2003 |
| JP | 2004-221774 A | 8/2004 |
| JP | 2005-033521 A | 2/2005 |
| JP | 2007-164412 A | 6/2007 |
| JP | 2008-177995 A | 7/2008 |

* cited by examiner

*Primary Examiner* — Benny Q Tieu
*Assistant Examiner* — Marcellus Augustin
(74) *Attorney, Agent, or Firm* — Canon U.S.A., Inc. IP Division

(57) ABSTRACT

A control method for controlling an image processing apparatus capable of transmitting image data using any one of a plurality of communication protocols includes holding, in a holding unit, management information for managing a destination of image data to be transmitted and a communication protocol associated with the destination, displaying one or more destination candidates according to a character string entered by a user and the management information held in the holding unit, determining, in a case where a destination is selected from the one or more displayed destination candidates, a communication protocol associated with the selected destination according to the management information held in the holding unit, and transmitting the image data to the selected destination via the determined communication protocol.

30 Claims, 27 Drawing Sheets

FIG.6

[DESTINATION TABLE]  ■ DESTINATION TYPE

NUMBER OF DESTINATIONS: 0   ● ALL

| ✓ TYPE | NAME | ADDRESS |
|---|---|---|
| 📞 | fax | 1111111 |
| ✉ | mail | abc@abc |
| 📠 | i-fax | abc@abc |
| ✉ | mail2 | sa |
| 📞 | fax2 | 1234 |

1/4

DETAILED INFORMATION ▶

| a | b | c | d | e | f | g | h | A-Z | 0-9 | ALL |

CANCEL   REGISTER   5025 — OK

SYSTEM STATUS/STOP ▶

FIG.14

| IndexID | NAME | ADDRESS | PROTOCOL | LINE SPEED / SPLIT TRANSMISSION / i-Fax MODE | DOMESTIC/ INTERNATIONAL TRANSMISSION / PAPER SIZE | ECM TRANSMISSION / COMPRESSION METHOD | RESOLUTION | DIVISION |
|---|---|---|---|---|---|---|---|---|
| 0x00000001 | "fax" | "1111111" | FAX | BPS33600 | DOMESTIC | OFF | | |
| 0x00000002 | "mail" | "abc@abc" | EMAIL | OFF | | | | |
| 0x00000003 | "i-fax" | "abc@abc" | IFAX | SIMPLE | DEFAULT | MR | DPI600 | ON |
| 0x00000004 | "mail2" | "sa" | EMAIL | ON | | | | |
| 0x00000005 | "fax2" | "1234" | FAX | BPS4800 | DOMESTIC | OFF | | |

FIG.19A

```
typedef enum {UNKNOWN=0, FAX, EMAIL, IFAX} ProtocolType;

/* Fax Attributes */
typedef enum {UNKNOWN=0, BPS33600, BPS14400, BPS9600, BPS4800} LineSpeed;
typedef enum {UNKNOWN=0, DOMESTIC, INTERNATIONAL} International;
typedef enum {UNKNOWN=0, OFF, ON} ModeECM;
typedef struct {
        LineSpeed       linespeed;
        International   international;
        ModeECP         ecm;
} FaxEntry;

/* eMail /iFax Attributes*/
typedef enum {UNKNOWN=0, OFF, ON} SplitMode;
typedef struct {
        SplitMode       split;
} EmailEntry;

/* iFax Attributes */
typedef enum {DEFAULT=0, SIMPLE, FULL} IfaxMode;
typedef enum {DEFAULT=0, B4, A3, B4A3} MediaSize;
typedef enum {DEFAULT=0, MR, MMR, MRMMR} CompMode;
typedef enum {DEFAULT=0, DPI200, DPI300, DPI400, DPI600} ResolveDPI;
typedef struct {
        IfaxMode        mode;
        MediaSize       size;
        CompMode        comp;
        ResolveDPI      reso;
        SplitMode       split;
} IfaxEntry;

/* Address Book entry */
typedef struct{
        unsigned int    indexID;
        unsigned char   name[];

unsigned char   address[];
        ProtocolType    protocol;
        union {
                FaxEntry        faxEntry;
                EmailEntry      emailEntry;
                IfaxEntry       ifaxEntry;
        } attributes;
} AddressEntry;

/* Address Book */
typedef AddressEntry    AddressBook[];
```

FIG.19B

```
Address Book    LocalAddressBook[] = {
        {0x00000001, "fax", "1111111", FAX, BPS33600, DOMESTIC, OFF, , },
        {0x00000002, "mail", "abc@abc", EMAIL, OFF, , , , },
        {0x00000003, "i-fax", "abc@abc", IFAX, SIMPLE, DEFAULT, MR, DPI600, ON },
        {0x00000004, "mail2", "sa", EMAIL, ON, , , , },
        {0x00000005, "fax2", "1234", FAX, BPS4800, DOMESTIC, OFF, , },
        ...
};
```

IMAGE PROCESSING APPARATUS CAPABLE OF TRANSMITTING IMAGE DATA USING ANY ONE OF A PLURALITY OF COMMUNICATION PROTOCOLS

BACKGROUND OF THE INVENTION

1. Field of the Invention

The present invention relates to an image processing apparatus, a method for controlling the image processing apparatus, and a program therefor.

2. Description of the Related Art

With conventional destination specification in mail transmission, a user has had to select either a method of selecting a destination from a destination database registered, for example, in an address book or a method of directly entering an address via a keyboard.

PC mail software, on the other hand, presents concerned destination candidates from registered destination information to the user based on a character string directly entered by the user. Japanese Patent Application Laid-Open No. 2003-16003 discusses a technique for combining the method of selecting a destination from registered data with the method of directly entering an address (hereinafter this hybrid method is referred to as autocomplete).

The above-mentioned technique has conventionally been applied to a single protocol (E-mail or HTTP protocol). On the other hand, a transmission function in a multifunction peripheral (MFP) handles a plurality of protocols such as facsimile (FAX), E-mail, Internet facsimile (i-Fax), and so on, and enables multi-address transmission for these protocols (hereinafter referred to as multi-protocol transmission). Further, since each of the above mentioned protocols has each individual destination attribute, the user has to correctly set not only a destination such as the Fax number and address but also various attributes according to the relevant destination protocol. Therefore, the autocomplete function has the following problems:

- Even when presenting destination candidates from registered data to the user, only address character strings are presented but attribute information for each destination is not presented.
- When the user enters the entire character string without selecting the registered data, the user cannot enter the attribute information for the destination by selecting the registered data.

These problems have not been surfaced as problems to be solved since the conventional autocomplete function handles a single protocol not provided with E-mail attributes or not requiring destination-specific settings. For example, the conventional autocomplete function is not provided with a split transmission setting which is one of E-mail attributes. At best, the entire mail software has only one split transmission setting, instead of having a split transmission setting for each destination. With facsimile (FAX), since it has not been necessary to change attributes generally if common attributes are used, the above-mentioned two problems have not been surfaced.

However, if the autocomplete function is applied to a communication protocol requiring attribute setting, the above-mentioned problems arise remarkably degrading operability.

SUMMARY OF THE INVENTION

According to an aspect of the present invention, an image processing apparatus capable of transmitting image data using any one of a plurality of communication protocols includes a holding unit configured to hold management information for managing a destination of image data to be transmitted and a communication protocol associated with the destination, a display unit configured to display one or more destination candidates according to a character string entered by a user and the management information held by the holding unit, a determining unit configured to, in a case where a destination is selected from the one or more destination candidates displayed by the display unit, determine a communication protocol associated with the selected destination according to the management information held by the holding unit, and a transmitting unit configured to transmit the image data to the selected destination via the communication protocol determined by the determining unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an exemplary address book destination selection screen according to an exemplary embodiment of the present invention.

FIG. 14 illustrates an exemplary structure of address book destination registration data according to an exemplary embodiment of the present invention.

FIGS. 19A and 19B illustrate exemplary code descriptions of a destination list.

DESCRIPTION OF THE EMBODIMENTS

Various exemplary embodiments, features, and aspects of the invention will be described in detail below with reference to the drawings.

Figure 1:
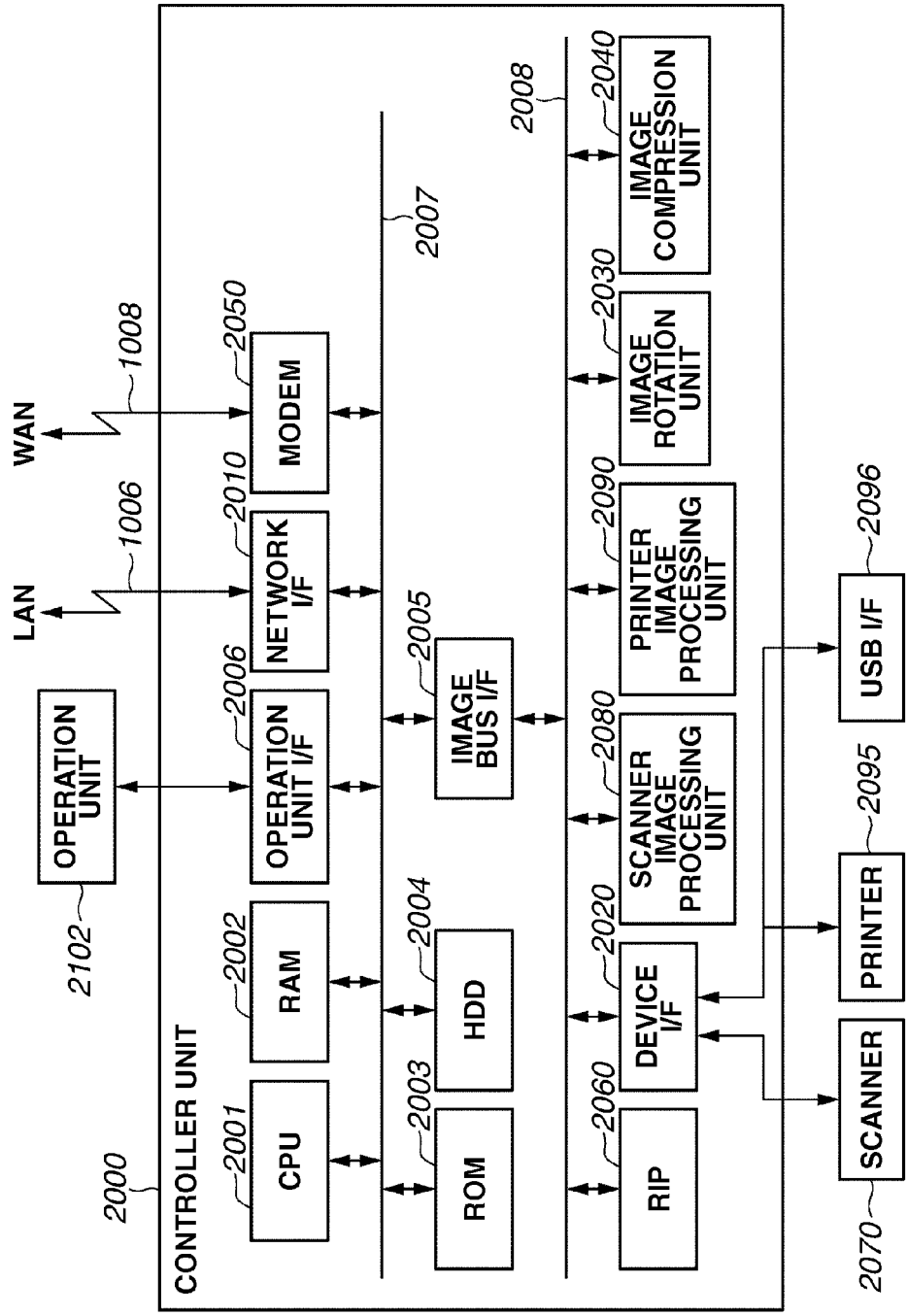
FIG. 1 is a block diagram of an image forming apparatus according to an exemplary embodiment of the present invention.

FIG. 1 is a block diagram illustrating a configuration of an essential part of an image forming apparatus (MFP 1001), which is an exemplary image processing apparatus according to an exemplary embodiment of the present invention. The MFP 1001 includes a controller unit 2000, and a scanner 2070 (image input device), a printer 2095 (image output device), and an operation unit 2012, which are connected to the controller unit 2000. The controller unit 2000 performs control to achieve a copy function for reading image data with the scanner 2070 and printing it with the printer 2095. At the same time, the controller unit 2000 also performs control to input and output image information and device information via a local area network (LAN) 1006 or a public line (wide area network (WAN)) 1008.

The controller unit 2000 specifically includes a central processing unit (CPU) 2001 which activates an operating system (OS) by using a boot program stored in a read-only memory (ROM) 2003. Under the control of the OS, the controller unit 2000 executes application programs stored in a hard disk drive (HDD) 2004 to perform various pieces of processing. The CPU 2001 uses a random access memory (RAM) 2002 as a work area. The RAM 2002 serves not only as a work area but also as an image memory area for temporarily storing image data. The HDD 2004 stores the application programs and image data. The CPU 2001 connects with the ROM 2003, the RAM 2002, an operation unit interface (I/F) 2006, a network I/F 2010, a modem 2050, and an image bus I/F 2005 via a system bus 2007. The operation unit I/F 2006, which is an interface to the operation unit 2012 having a touch panel, outputs to the operation unit 2012 image data to be displayed thereon. The operation unit I/F 2006 also transmits to the CPU 2001 information entered by the user via the operation unit 2012.

The network I/F 2010 connects with the LAN 1006 to input and output via the LAN 1006 information to/from apparatuses thereon. The modem 2050 connects with the public line 1008 to output and input information via the public line 1008. The image bus I/F 2005 serves as a bus bridge for connecting the system bus 2007 and an image bus 2008 and converting data format. The image bus 2008 transmits image data at high speed. The image bus 2008 includes a peripheral components interconnect (PCI) bus or IEEE 1394. The image bus 2008 connects with a raster image processor (RIP) 2060, a device I/F 2020, a scanner image processing unit 2080, a printer image processing unit 2090, an image rotation unit 2030, and an image compression unit 2040. The RIP 2060 rasterizes the PDL code into a bitmap image. The device I/F 2020 connects with the scanner 2070 and the printer 2095. The device I/F 2020 performs format conversion between synchronous and asynchronous image data. The scanner image processing unit 2080 corrects, processes, and edits input image data. The printer image processing unit 2090 corrects print output image data and converts its resolution according to the printer 2095. The image rotation unit 2030 rotates the image data. The image compression unit 2040 compresses multivalued image data into JPEG data, compresses binary image data into JBIG, MMR, and MH data, and decompresses these pieces of compressed data.

A universal serial bus (USB) I/F 2096 performs communication with a USB memory stick connected to a USB connection slot provided in the image forming apparatus. The scanner image processing unit 2080 performs predetermined processing of the image data read by the scanner 2070, and stores the data in the USB memory stick connected to the image forming apparatus via the USB I/F 2096. The USB I/F 2096 reads the image data from the USB memory stick. The printer image processing unit 2090 converts it to printable image data. The printer 2095 prints the printable image data.

Figure 2:
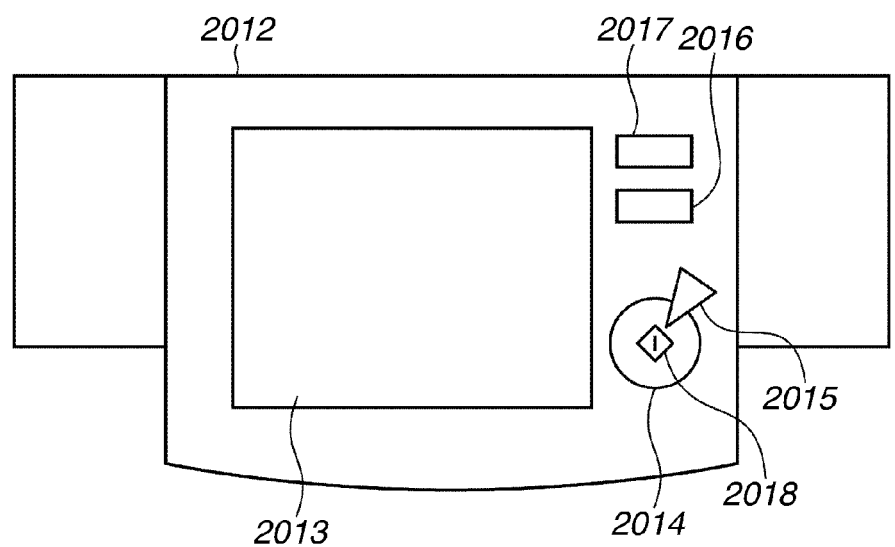
FIG. 2 is a plan view illustrating an operation unit of the image forming apparatus according to an exemplary embodiment of the present invention.

FIG. 2 is a plan view illustrating a configuration of the operation unit 2012 illustrated in FIG. 1. A liquid crystal display (LCD) unit 2013, including an LCD and a touch-panel sheet stuck thereon, displays an operation screen of the MFP 1001 and, when the user presses a key display on the screen, notifies relevant positional information to the CPU 2001 of the controller unit 2000. A start key 2014 is used to start reading a document image. A two-color (green/red) light emitting diode (LED) 2018 is disposed at the center of the start key 2014 to denote whether the start key 2014 is operative. A stop key 2015 is operated to stop the operation currently in progress. An identification (ID) key 2016 is used to input a user ID of the user. A reset key 2017 is used to initialize the settings made from the operation unit 2012.

Hereinafter, an expression "display a screen" or "open a screen" specifically refers to the following processing. The CPU 2001 loads relevant screen display data and screen control data from the HDD 2004 or the RAM 2002, and displays the screen display data on the LCD unit 2013 of the operation unit 2012 via the operation unit I/F 2006.

Similarly, an expression "the user selects . . . " refers to a user's action to press a button or list displayed on the screen. Based on positional information and screen control data notified from the LCD display unit 2013, the CPU 2001 can determine processing to be executed thereby according to user's selection. User interface screens described in the present exemplary embodiment are to be considered as examples, and the configuration and arrangement of these screens are not limited thereto.

Figure 3:
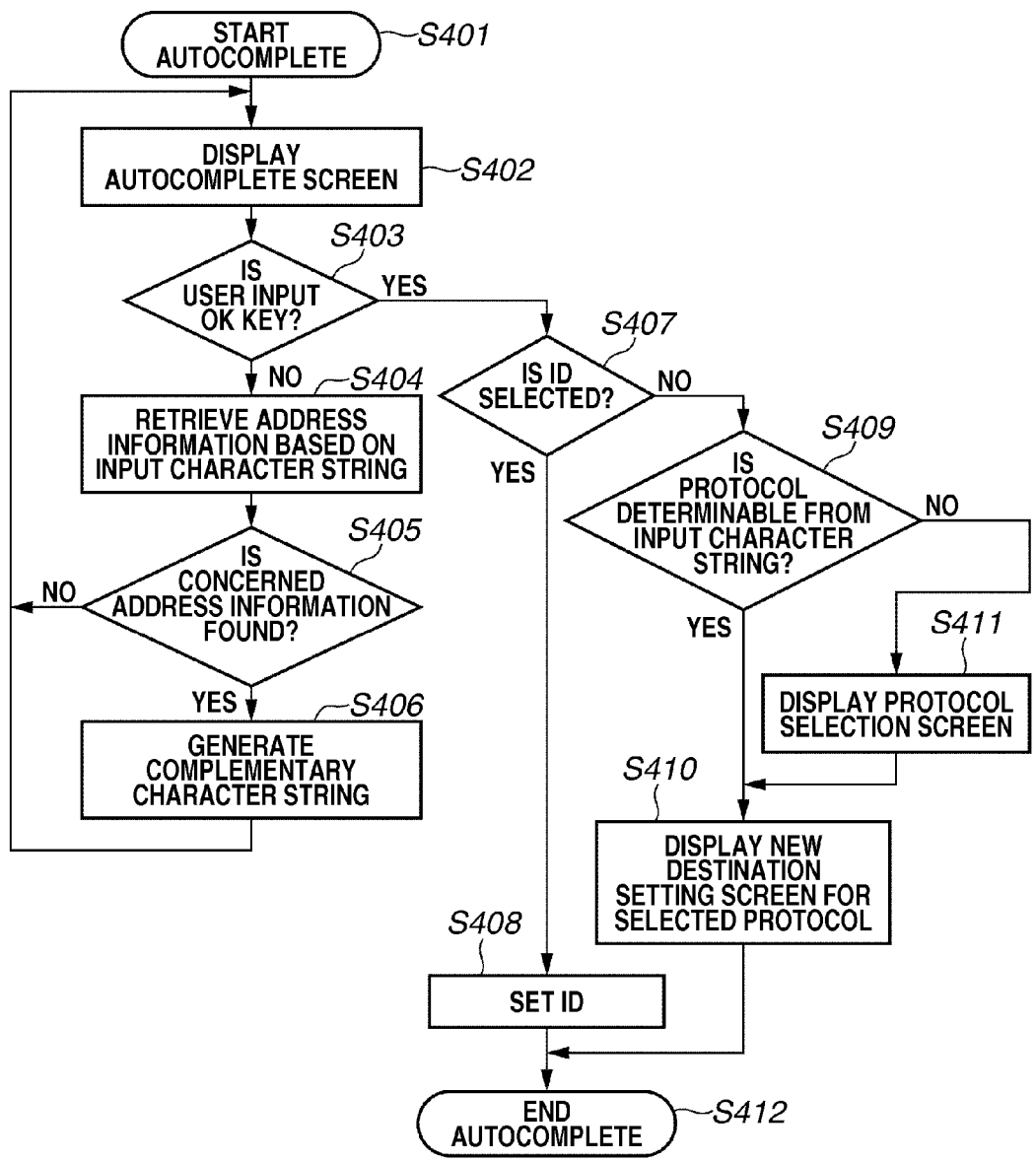
FIG. 3 is a flow chart illustrating autocomplete processing according to a first exemplary embodiment of the present invention.

FIG. 3 is a flow chart illustrating processing of autocomplete processing according to an exemplary embodiment of the present invention. The flow chart in FIG. 3 is implemented when the CPU 2001 loads a relevant program from the ROM 2003 to the RAM 2002 and then executes it.

In step S401, autocomplete processing is activated, for example, when the user has entered a character string as an input item such as an address. In step S402, the CPU 2001 displays a screen for performing autocomplete processing. Each screen described in this flow chart will be described below with reference to exemplary screens. In step S403, the CPU 2001 determines whether the user input is the OK key displayed on the screen. When the user input is the OK key (YES in step S403), the processing proceeds to step S407. Otherwise (NO in step S403), the processing proceeds to step S404.

In step S404, the CPU 2001 retrieves concerned destination information from a destination database storing destination information based on the character string entered by the user (hereinafter referred to as user-input character string). Retrieval will be described in detail below with reference to the accompanying drawings. In step S405, the CPU 2001 determines whether the concerned destination information is found as a result of retrieval in step S404. When the concerned destination information is found (YES in step S405), the processing proceeds to step S406. Otherwise (NO in step S405), the processing returns to step S402. In step S406, the CPU 2001 generates a complementary character string based on the destination obtained by retrieval and the user-input character string. Generation of a complementary character string will be described below with reference to the accompanying drawings. After generating a complementary character string, the processing returns to step S402 to update the autocomplete screen.

When the CPU 2001 determines that the user input is the OK key (YES in step S403), the CPU 2001 advances processing to step S407 to determine whether the ID (IndexID) is selected. The ID will be described below. When the ID is selected, the processing proceeds to step S408. Otherwise, the processing proceeds to step S409. In step S408, the CPU 2001 sets the selected ID. In step S412, the CPU 2001 ends processing. When the CPU 2001 determines that the ID is not selected (NO in step S407), the CPU 2001 advances processing to step S409 to determine whether a communication protocol is determinable from the user-input character string. The determination method will be described below with reference to the accompanying drawings. When the CPU 2001 determines that a communication protocol is determinable (YES in step S409), the CPU 2001 advances processing to step S410. Otherwise, the CPU 2001 advances processing to step S411. In step S411, the CPU 2001 displays a protocol selection screen to allow the user to select a communication protocol. Then, when the user has selected a communication protocol, the processing proceeds to step S410. In step S410, the CPU 2001 displays a new destination setting screen for either the communication protocol determined in step S409 or the communication protocol selected by the user in step S411. Then, the processing proceeds to step S412 to end processing. When a destination is specified in step S408 or S410, the CPU 2001 reads document data with the scanner 2070 and then transmits the read data to the specified destination in response to a transmission start instruction from the user. As data to be transmitted, the user may specify data prestored in the HDD 2004 before the user issues the transmission start instruction. In this case, when the user issues the transmission start instruction, the CPU 2001 transmits the specified data to the specified destination.

In the present exemplary embodiment, FAX (facsimile), E-mail, and I-FAX (Internet facsimile) are used as exemplary communication protocols for image data transmission. However, communication protocols are not limited thereto. Multi-protocol environment, for example, may include any other communication protocol for image data transmission.

Figure 4:
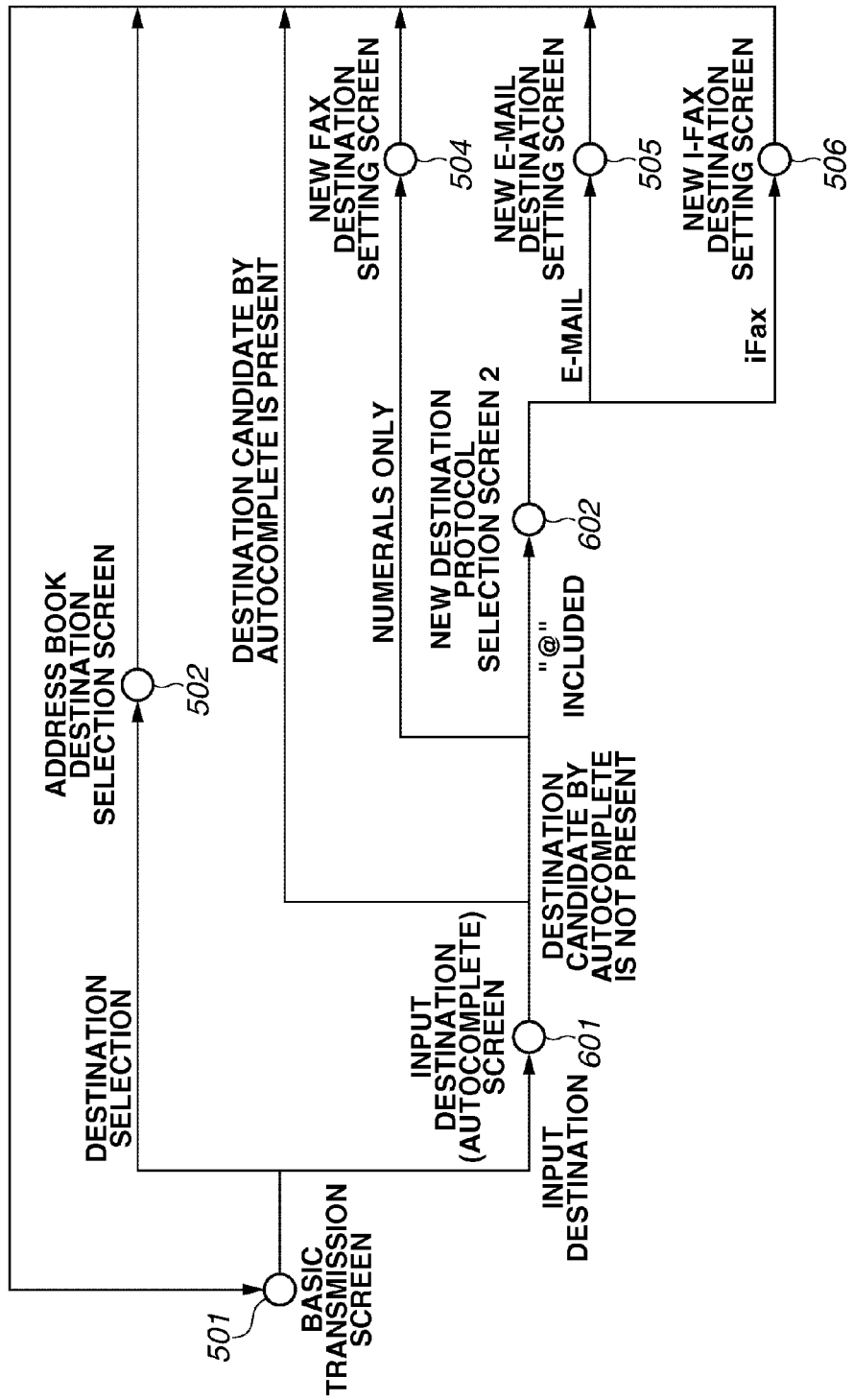
FIG. 4 is a conceptual view illustrating screen transition according to the first exemplary embodiment of the present invention.

FIG. 4 is a conceptual view illustrating screen transition according to an exemplary embodiment of the present invention. Hereinafter, numbers enclosed in parentheses denote the numbers in the screen transition diagram. This screen transition diagram also corresponds to the flow chart illustrated in FIG. 3.

When the user knows that a desired destination has been registered in the address book (destination database) and wants to select it from the address book, the user selects an address book destination selection screen (502) from a basic transmission screen (501). Then, the user selects the desired destination on the address book destination selection screen (502) and then returns to the basic transmission screen (501), thus achieving an address book retrieval method. When the user is not sure that the desired destination has been registered in the address book, the user selects the autocomplete screen (601). When the user enters a destination, one or more destination candidates are retrieved from registered destinations and then displayed. When the desired destination is included in the displayed destination candidates, the user selects the destination from the address book and then returns to the basic transmission screen (501).

When destination candidates cannot be retrieved based on the user-input character string, only the user-input character string is eventually displayed on the autocomplete screen (601). When the user applies the input character string in this state, the CPU 2001 determines a communication protocol from the characteristics of the input character string. For example, when the input character string includes only numerals, the CPU 2001 determines that it is a Fax number and displays the new Fax destination setting screen (504). In this case, the CPU 2001 handles the input character string as a Fax number entered by the user. On the other hand, for example, when the input character string has a format that can be transmitted by both E-mail and i-Fax, such as "abc@abc.co.jp", the CPU 2001 cannot determine a communication protocol from the input character string and, therefore, displays a new destination protocol selection screen 2 (602). When the user selects "E-mail" in the new destination protocol selection screen 2 (602), the CPU 2001 displays the new E-mail destination setting screen (505). When the user selects "i-Fax", the CPU 2001 displays the new i-Fax destination setting screen (506). When the user has made desired settings on the new destination setting screen for each communication protocol (504, 505, and 506), the processing returns to the basic transmission screen (501).

A method for setting a new destination is achieved by displaying new destination setting screen for each communication protocol.

Figure 5A:
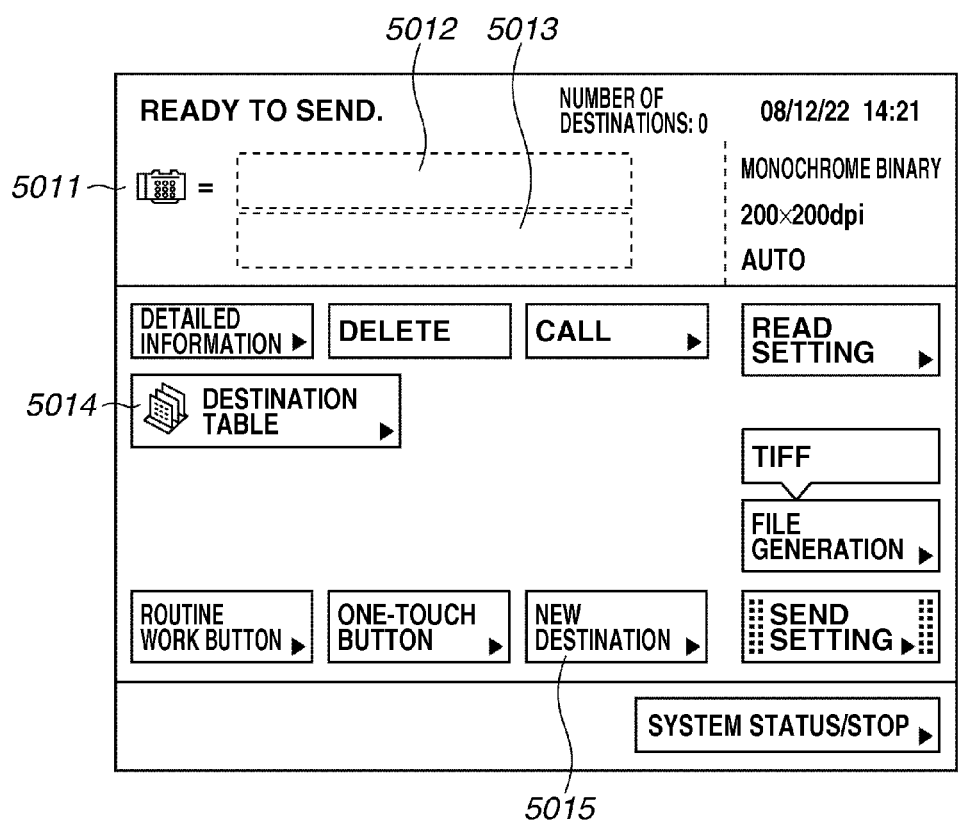
FIGS. 5A and 5B illustrate exemplary basic transmission screens of the operation unit according to an exemplary embodiment of the present invention.
Figure 5B:
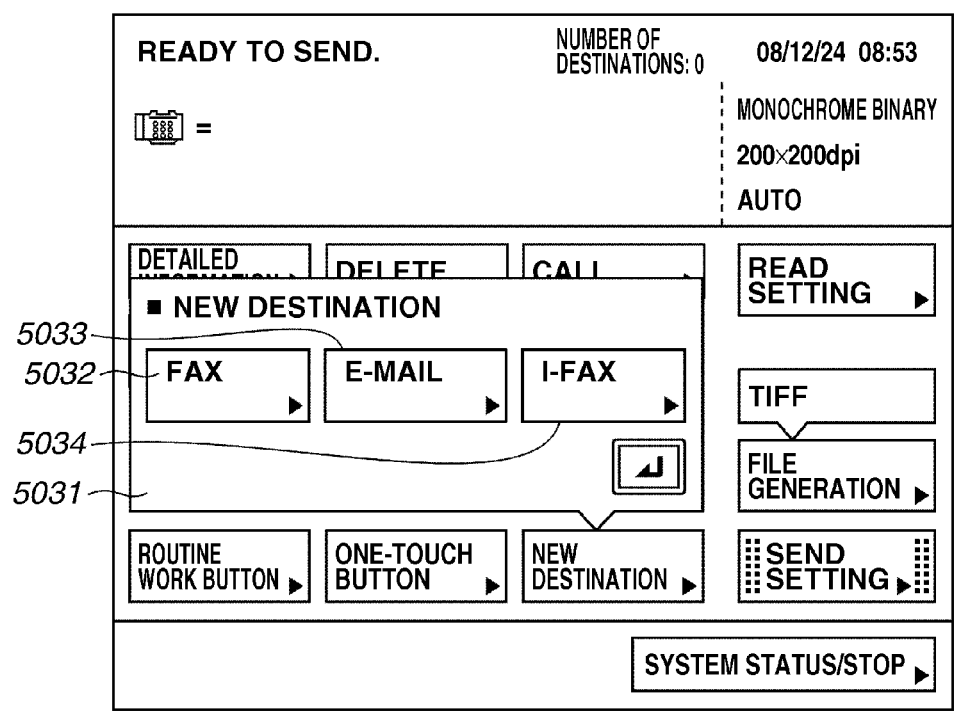
Figure 15:
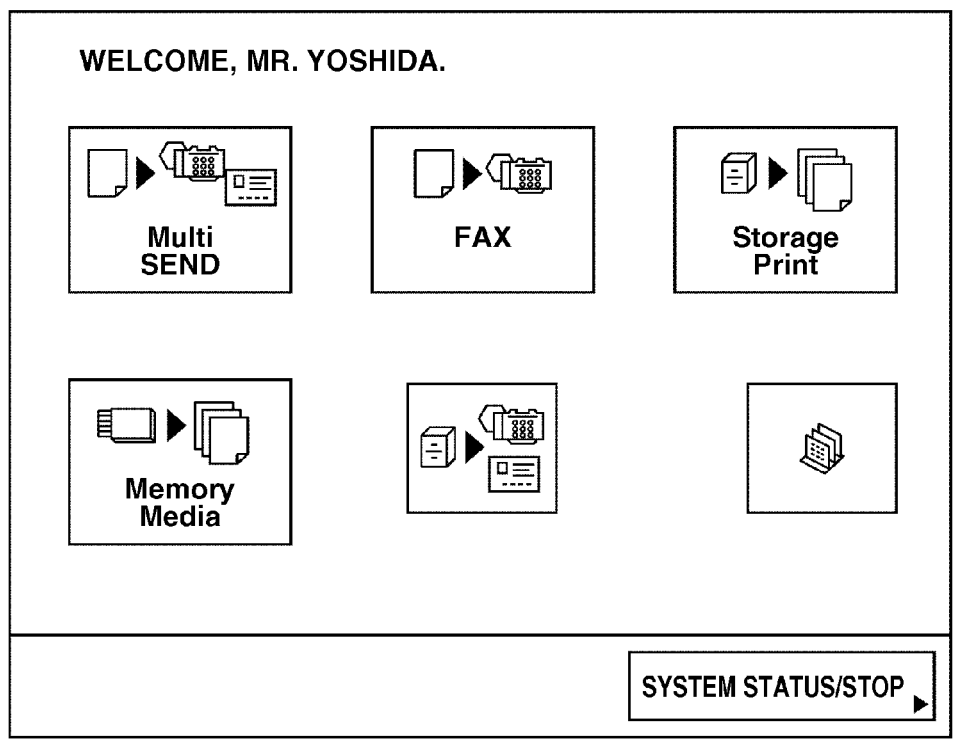
FIG. 15 illustrates an exemplary function selection menu screen according to an exemplary embodiment of the present invention.

FIG. 15 illustrates an exemplary function selection menu provided by the MFP. When the user selects the multi-protocol transmission function (MultiSEND) from this function selection menu, the CPU 2001 displays the basic transmission screen (501) as illustrated in FIG. 5A. FIG. 5A is to be considered as an example for description. Referring to FIG. 5A, when the user presses a "New destination" button 5015, the CPU 2001 displays a protocol selection screen (502) as illustrated in FIG. 5B, thus allowing the user to select a communication protocol. A method for selecting a protocol is achieved by displaying the protocol selection screen.

Figure 8:
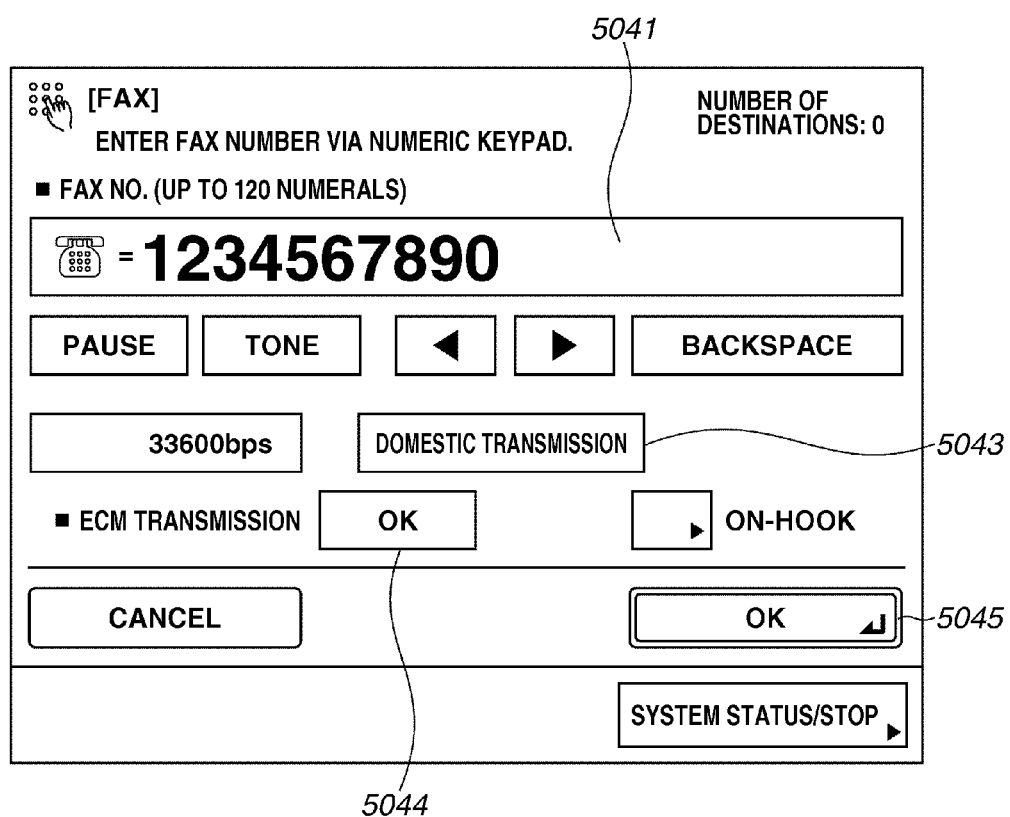
FIG. 8 illustrates an exemplary new Fax destination setting screen according to an exemplary embodiment of the present invention.
Figure 9A:
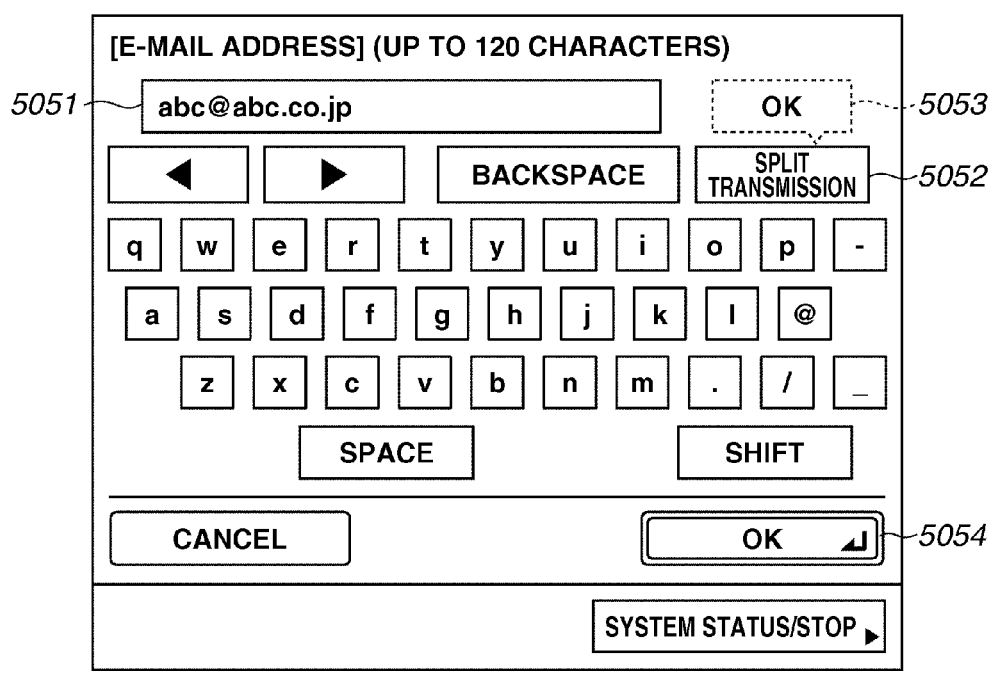
FIGS. 9A and 9B illustrate exemplary new E-mail destination setting screens according to an exemplary embodiment of the present invention.
Figure 10A:
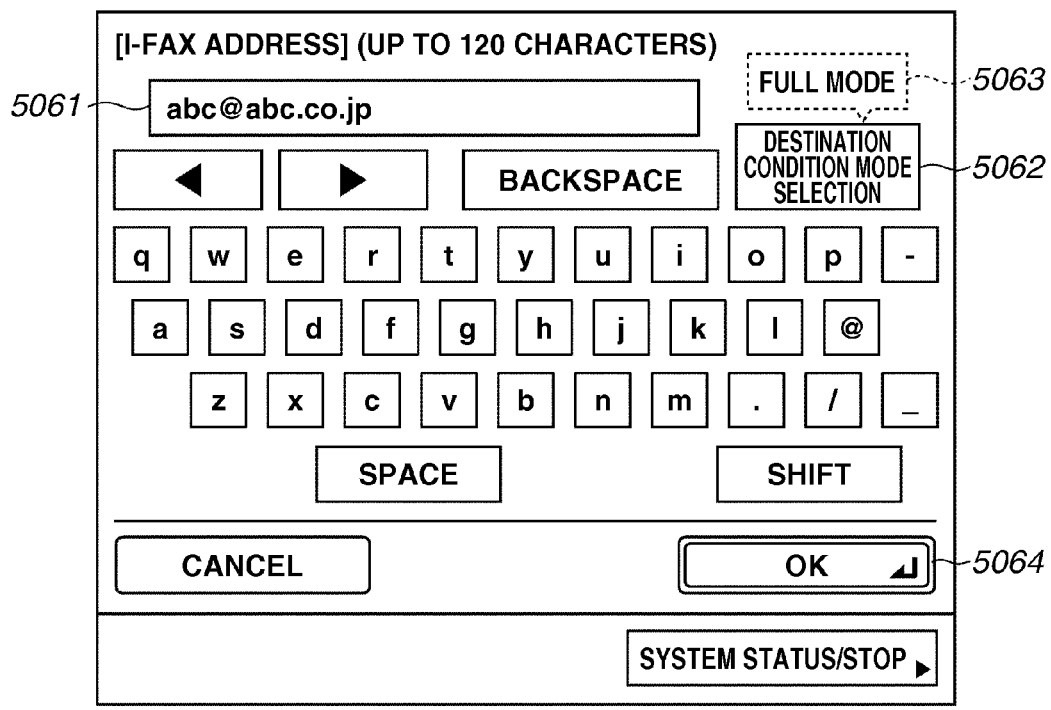
FIGS. 10A and 10B illustrate exemplary new i-Fax destination setting screens according to an exemplary embodiment of the present invention.

Referring to FIG. 5B, the user presses any one of a "FAX" selection button 5032, an "E-mail" selection button 5033, and an "i-Fax" selection button 5034. Subsequently, the user can set a destination in the new destination setting screen for the selected communication protocol (504, 505, or 506). An exemplary FAX setting screen (504) is illustrated in FIG. 8. The FAX setting screen includes a FAX number setting portion 5041, a transmission rate setting button 5042, a "Domestic/international transmission" setting button 5043, and an "ECM transmission" setting button 5044. An exemplary E-mail setting screen (505) is illustrated in FIG. 9A. The E-mail setting screen includes a mail address setting portion 5051, a "Split transmission" setting button 5052, and a split transmission setting display portion 5053. An exemplary i-Fax setting screen is illustrated in FIG. 10A. The i-Fax setting screen includes an i-Fax address setting portion 5061, a "Destination condition mode selection" button 5062, and a transmission mode display portion 5063.

Figure 7A:
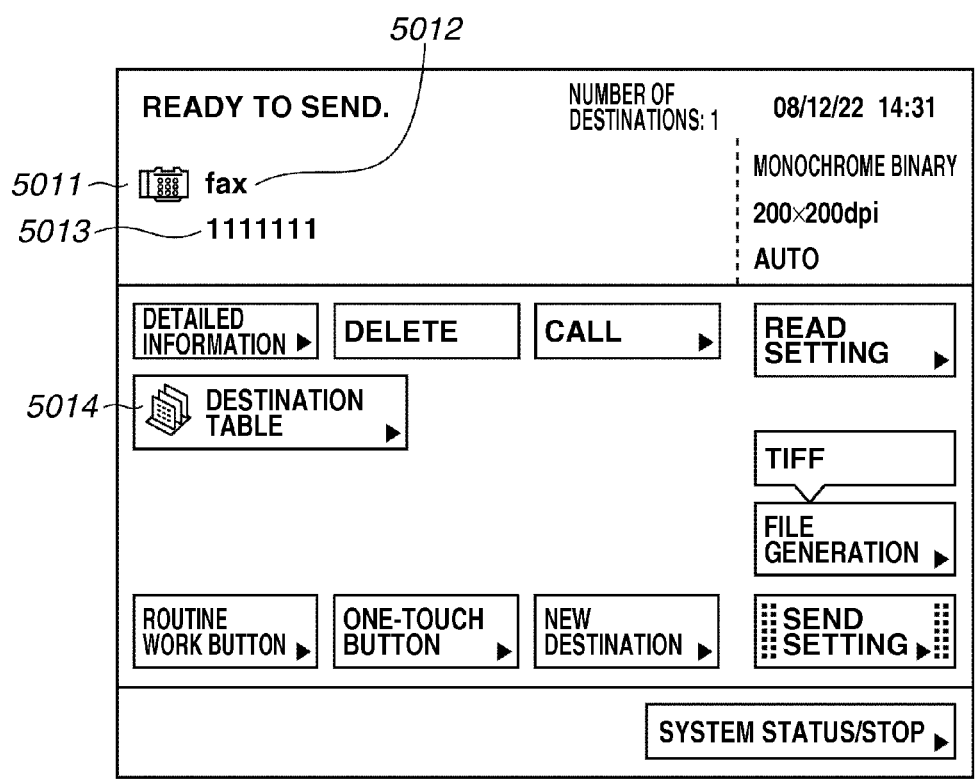
FIGS. 7A and 7B illustrate exemplary address book destination selection states in the basic transmission screen according to an exemplary embodiment of the present invention.

The basic transmission screen (501) includes a setting address check area which includes a protocol icon display portion 5011, a first text display area 5012, and a second text display area 5013. Referring to FIG. 5A, rough ranges of the first text display area 5012 and the second text display area 5013 are illustrated with dashed lines. When the user selects a destination registered in the address book destination selection screen (502) as illustrated in FIG. 6, the CPU 2001 displays the corresponding registered name in the first text display area 5012 and the FAX number or address (information associated with the registered name) in the second text display area 5013, as illustrated in FIG. 7A. The address book destination selection screen (502) will be described below with reference to FIG. 6.

Figure 7B:
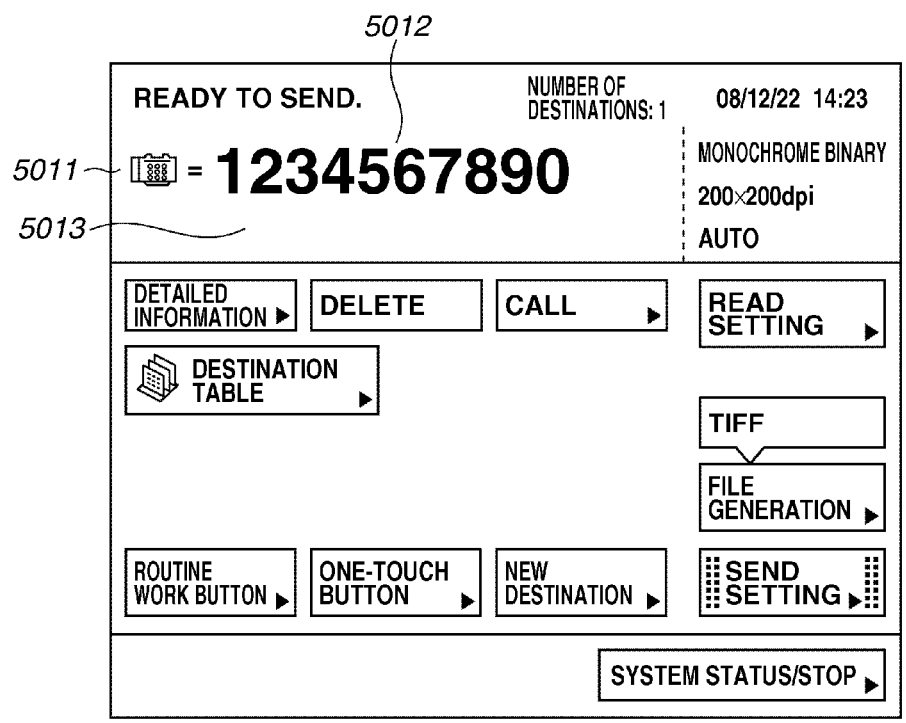
Figure 9B:
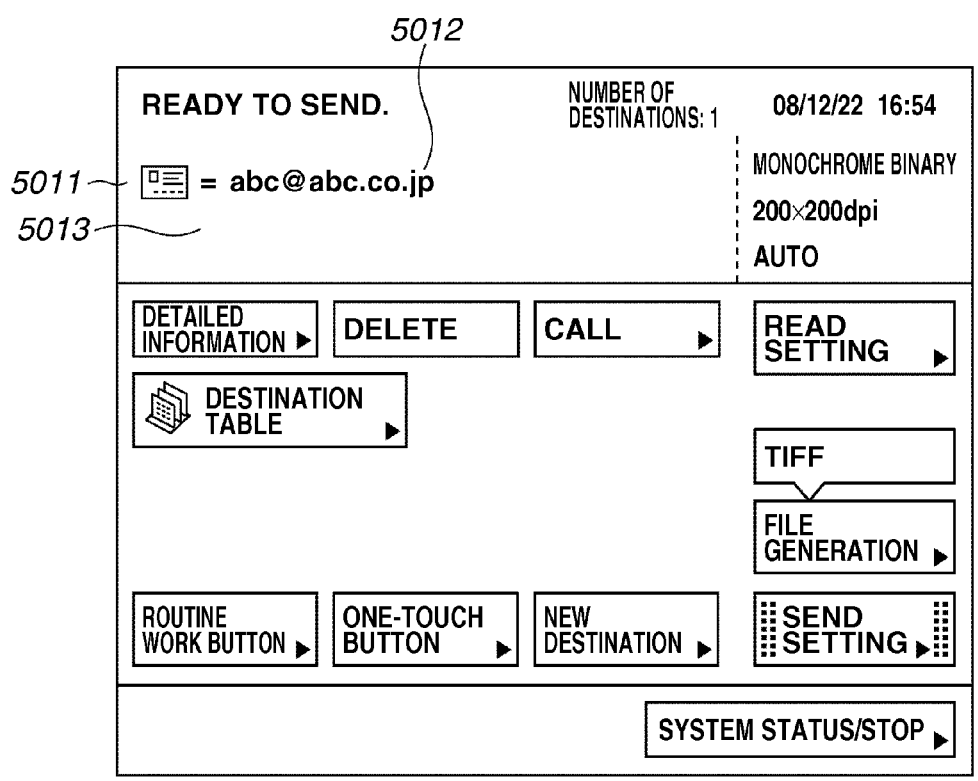
Figure 10B:
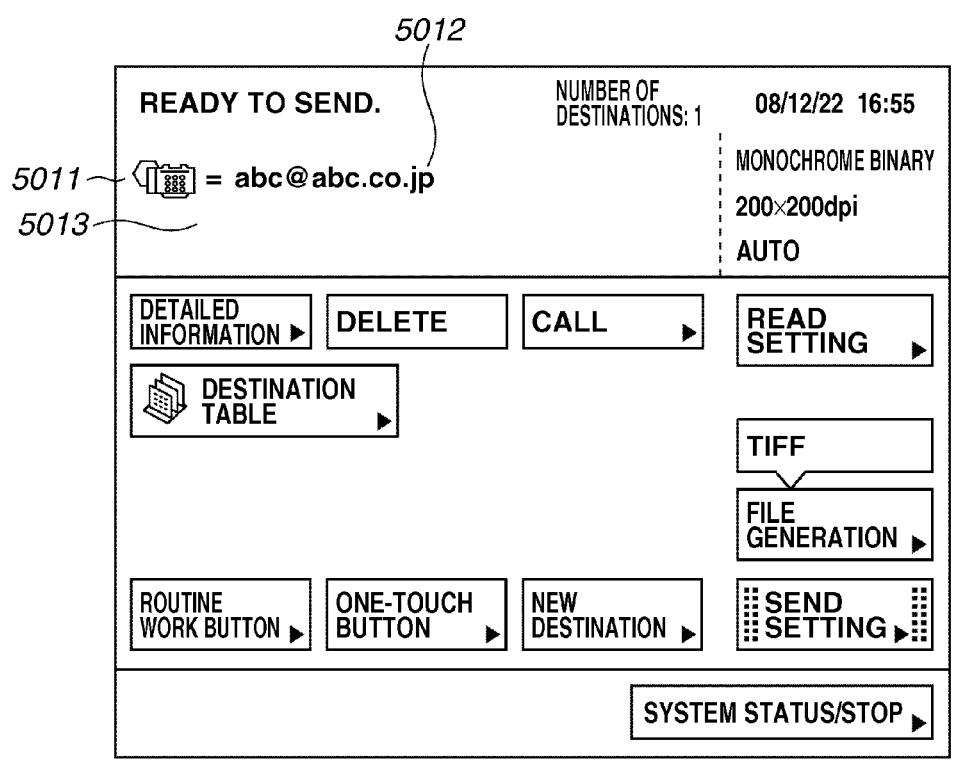

When the user directly inputs a new address, the CPU 2001 displays the new address so as to be distinguishable from registered destinations. For example, as illustrated in FIGS. 7B, 9B, and 10B in the case of FAX, E-mail, and i-Fax, respectively, the CPU 2001 displays a protocol icon in the protocol icon display portion 5011 and a user-input character string in the first text display area 5012. The basic transmission screen (501) further includes a destination table button 5014 for opening the address book destination selection screen (502) and a "New destination" button 5015 for opening the autocomplete screen (601).

FIG. 6 illustrates an exemplary address book destination selection screen (502) for selecting a destination registered in the address book serving as a destination database. In the exemplary address book destination selection screen (502) in FIG. 6, each row in the registered destination list includes a check mark display portion 5021 denoting that each row is selected, a destination protocol icon display portion 5022, a destination name display portion 5023, and an address display portion 5024. However, the screen configuration is not limited thereto, but may include any other elements.

When the user presses a desired row in the destination list, the destination is selected. When the user selects one or more rows and then presses an "OK" button 5025, the settings are applied and the processing proceeds to the basic transmission screen (501). In this case, the CPU 2001 adds to the destination list an entry corresponding to the selected row in the destination list having the same structure as the address book in FIG. 14, and then closes the screen. More specifically, referring to FIG. 6, suppose that the user selects the first row and presses the "OK" button 5025, the CPU 2001 adds the following entry to the destination list.
{0x00000001,"fax","1111111",FAX,BPS33600,DOMESTIC,OFF , , , }
The attribute information included in the destination information in each address illustrated in the present exemplary embodiment is not limited thereto, but may include any other attribute information. The basic transmission screen (501) invokes an address book entry based on IndexID in the destination list, and displays the entry as illustrated in FIG. 7A. In this case, both the destination list entry and the address book entry for IndexID=0x00000001 have the following value:
{0x00000001,"fax","1111111",FAX,BPS33600,DOMESTIC,OFF , , , }
When displaying the address book destination selection screen (502), the CPU 2001 reads the address book data having the structure illustrated in FIG. 14. It is necessary that the address book data is prestored in the HDD 2004 and the CPU 2001 reads the address book data prestored in the HDD 2004. FIG. 19A illustrates an exemplary data structure definition which includes a configuration for each communication protocol. However, the data structure definition is not limited thereto, but may be modified depending on the program language used. When initializing the address book data in FIGS. 6 and 14 according to the definition in FIG. 19A, an exemplary code illustrated in FIG. 19B can be described. In other words, this code represents each piece of information to be included in the database in the initial state. The CPU 2001 uses an address book (destination database) having the above-mentioned data structure to hold destinations that can be transmitted by each communication protocol, thus achieving a method for holding destinations.

Figure 11A:
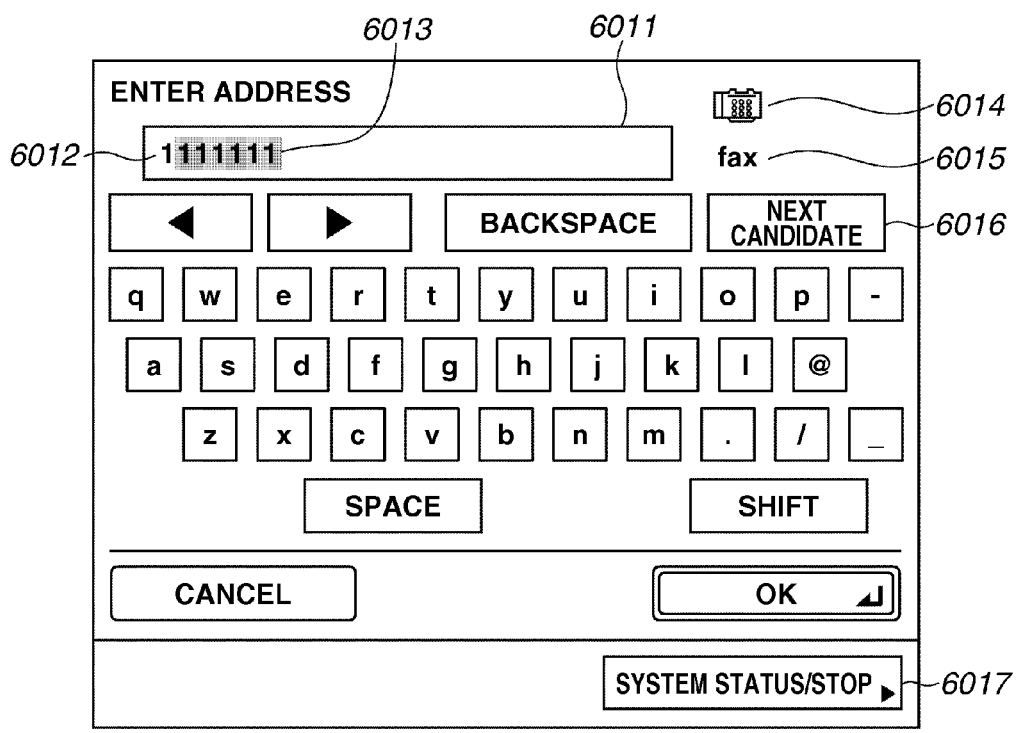
FIGS. 11A to 11C each illustrate an exemplary output of an autocomplete screen according to the first exemplary embodiment of the present invention.

FIG. 11A illustrates an exemplary autocomplete screen which is displayed when the user presses the "New destination" button 5015 in the basic transmission screen (501) illustrated in FIG. 5A. In destination retrieval, the CPU 2001 selects a destination having an address starting with the user-input character string as a destination candidate. When there is a plurality of destination candidates, the CPU 2001 displays these candidates in order of the priority of the character immediately following the character string coinciding with the user-input character string, for example, in ascending order of the character code. Thus, a method for displaying the next candidate is achieved. FIG. 11A illustrates a state where the user has entered "1" (user-input character string="1"). The CPU 2001 retrieves destinations having an address starting with "1" registered in the address book based on the user-input value "1", and finds "1111111" (IndexID=0x00000001) and "1234" (IndexID=0x00000005).
LocalAddressBook[0x00000001].address="1111111"
LocalAddressBook[0x00000005].address="1234"
The above-mentioned description format is represented by the definition illustrated in FIG. 19 and may be other expression formats or different according to the program language used for definition.

The characters immediately following the character string coinciding with the user-input character string are "1" (0x31) and "2" (0x32), respectively. Therefore, when the priority is given to the character code in ascending order, the CPU 2001 gives the first priority to the destination "1111111" and the second priority to the destination "1234" (candidate IndexID=0x00000001). Then, to display a candidate, the CPU 2001 generates a complementary character string given the first priority by deleting the user-input character string "1" from the top of the address character string "1111111", and stores the resultant character string as a complementary character string ("111111"). In a destination input area 6011, the CPU 2001 first displays the user-input character string "1" (6012) and subsequently displays the complementary character string (6013) with a different display method (for example, highlight display as illustrated in the present exemplary embodiment). A method for displaying a complementary character string immediately following the user-input character string is achieved in this way.

Figure 11B:
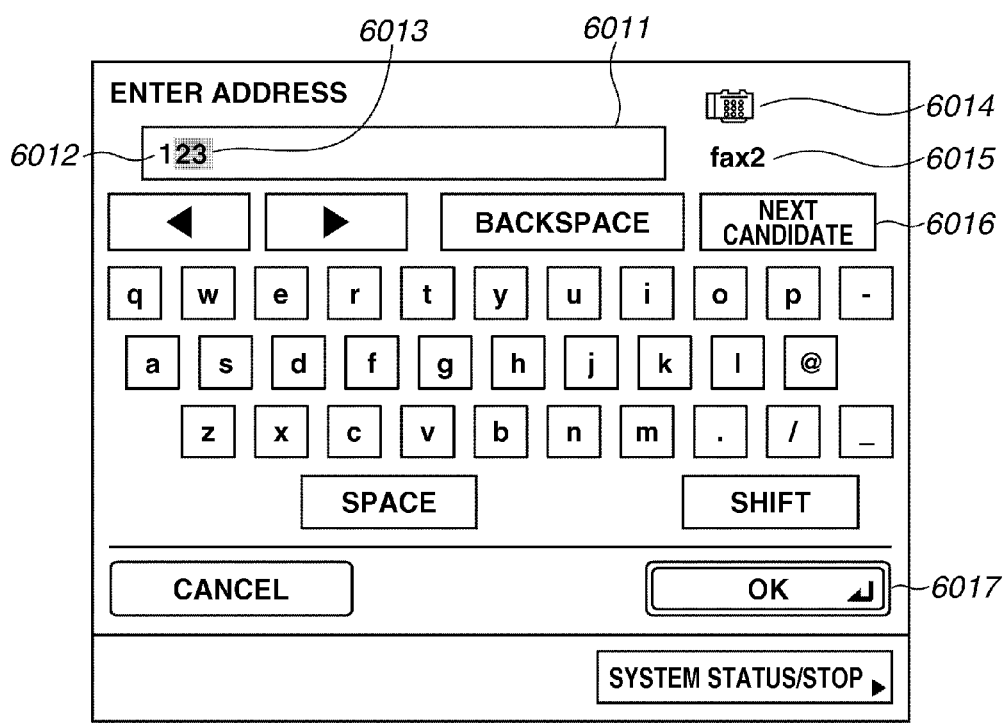

Further, the CPU 2001 acquires a protocol for the candidate IndexID (FAX in this example), and displays a corresponding icon in a protocol icon display area 6014. Similarly, the CPU 2001 acquires a destination name ("fax") and then displays it in a destination name area 6015. In this case, the acquired values include candidate IndexID=0x00000001, complementary character string="111111", protocol=FAX, and destination name="fax." Further, when the user presses a "Next candidate" button 6016, the CPU 2001 selects the destination candidate (IndexID=0x00000005 in this example) given the second priority (candidate IndexID=0x00000005). Similarly, the CPU 2001 generates a complementary character string for the candidate IndexID, acquires a protocol and a destination name, and displays the screen in FIG. 11B. In this case, the acquired attribute information includes complementary character string="234", protocol=FAX, and destination name="fax2."

A case where no candidate is found in destination retrieval in the address book data will be described below. Suppose that the user keeps entering characters and the user-input character string becomes "1234567890." In this case, since there is no destination data having an address starting with the user-input character string in the address book data, no candidate IndexID is selected (candidate IndexID=NULL).

Figure 11C:
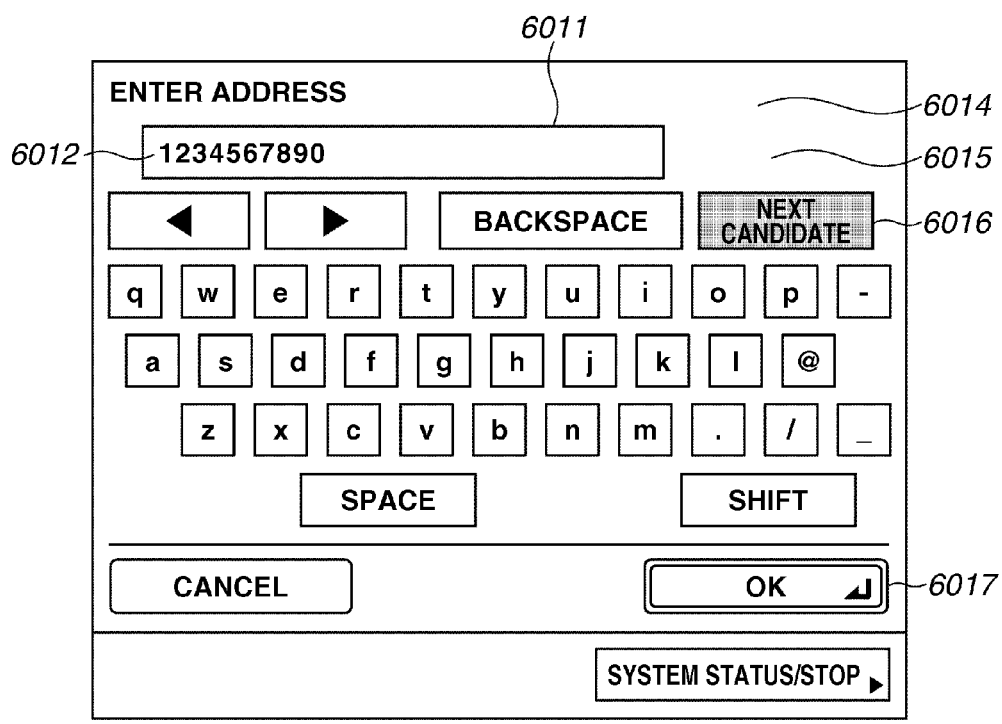

When no candidate IndexID is selected (when candidate IndexID=NULL), since the autocomplete screen (601) does not generate a complementary character string, and, therefore, displays nothing in the protocol icon display area 6014 and the destination name area 6015. Further, the CPU 2001 disables the "Next candidate" button 6016. As a result, the screen in FIG. 11C is displayed. In this case, the acquired values include user-input character string="1234567890", candidate IndexID=NULL, and complementary character string=NULL.

A case where the same address is registered in a plurality of pieces of destination data will be described below. Description will be made for a case where the user-input character string is "ab" (user-input character string="ab"). In the address book illustrated in FIG. 14, when the user-input character string is "ab", the CPU 2001 retrieves destinations having an address starting with "ab" registered in the address book and finds that the following destinations are registered. Specifically, "abc@abc" (IndexID=0x00000002) and "abc@abc" (IndexID=0x00000003) are registered as follows:
LocalAddressBook[0x00000002].address="abc@abc"
LocalAddressBook[0x00000003].address="abc@abc"
Since the same character string is registered in both destinations, there arises no difference simply by giving the priority in order of the character code.

Figure 12A:
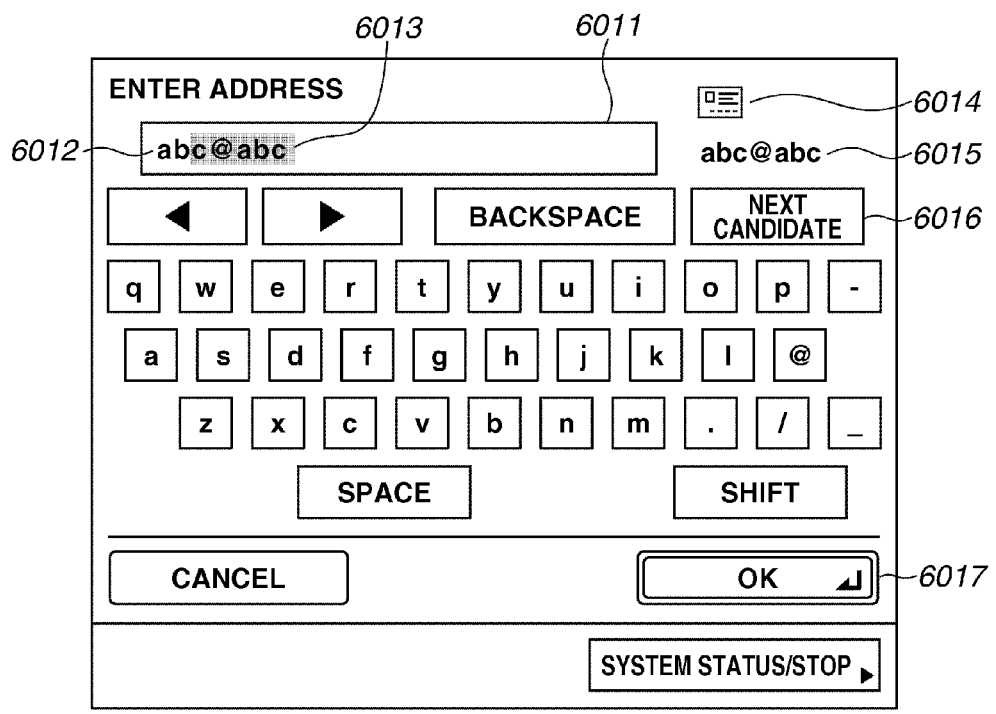
FIGS. 12A to 12C each illustrate an exemplary output of the autocomplete screen according to the first exemplary embodiment of the present invention.

Therefore, in the present exemplary embodiment, the second priority is given to IndexID in ascending order. Thus, the destination for IndexID=0x00000002 is given the first priority, and the destination for IndexID=0x00000003 is given the second priority (candidate IndexID=0x00000002). Then, to display a candidate, the CPU 2001 generates a complementary character string given the first priority (complementary character string="c@abc"). In the destination input area 6011, the CPU 2001 first displays the user-input character string "a" (6012) and subsequently displays the complementary character string (6013) with a different display method (highlight display in the present exemplary embodiment). Further, the CPU 2001 acquires a protocol (EMAIL) for the candidate IndexID and displays a corresponding icon in the protocol icon display area 6014. Similarly, the CPU 2001 acquires a destination name ("mail") and displays it in the destination name area 6015. As a result, the screen illustrated in FIG. 12A is displayed. In this case, the acquired values include candidate IndexID=0x00000002, complementary character string="c@abc", protocol=EMAIL, and destination name="mail."

Figure 12B:
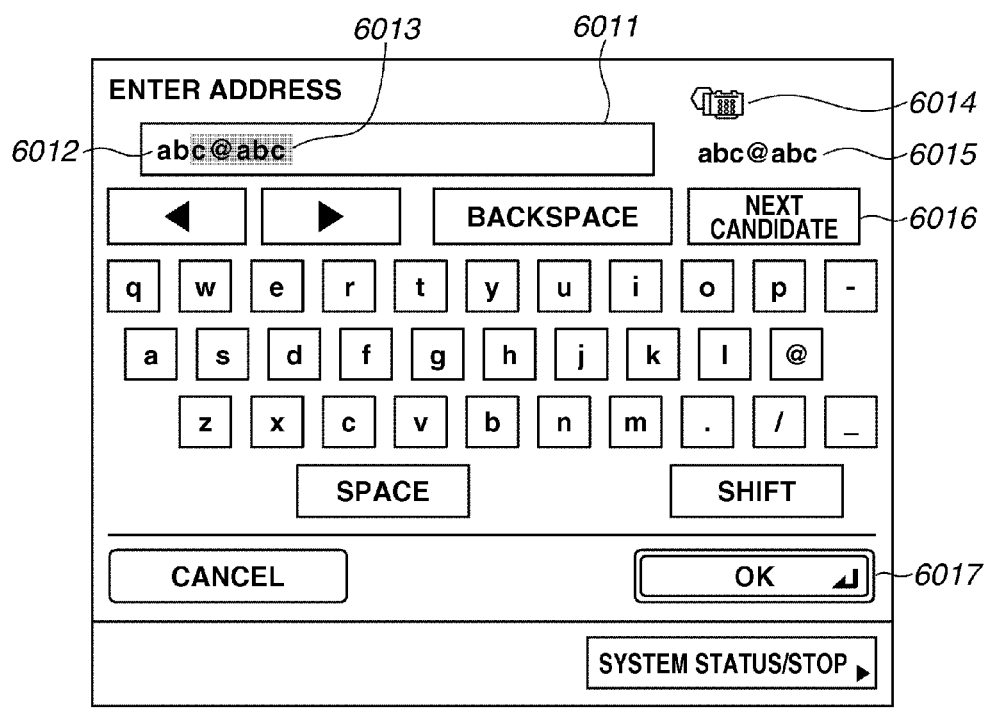
Figure 12C:
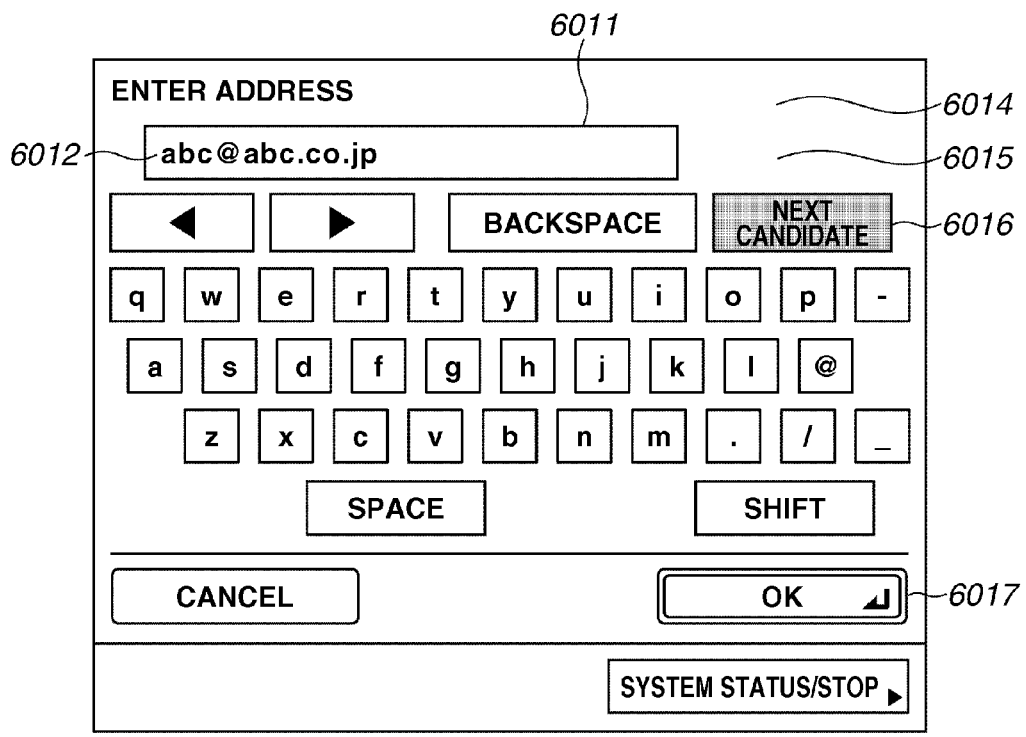

When the user presses the "Next candidate" button 6016, the CPU 2001 selects the destination candidate (IndexID=0x00000003) given the second priority (candidate IndexID=0x00000003). This destination candidate is given the next higher priority than the destination candidate currently displayed. Similarly, the CPU 2001 generates a complementary character string for the candidate IndexID, acquires a protocol and a destination name, and displays these pieces of information. As a result, the screen in FIG. 12B is displayed. In this case, the acquired values include complementary character string="234", complementary character string="c@abc", protocol=IFAX, and destination name="i-fax." Suppose that the user keeps entering characters and the user-input character string becomes "abc@abc.co.jp", the CPU 2001 displays the screen in FIG. 12C since there is no character string coinciding with the user-input character in the address book data.

A case where a destination candidate is displayed in FIG. 11A will be described below. The user can apply the destination setting by pressing the "OK" button 6017. In this case, the acquired values include candidate IndexID=0x00000001, complementary character string="111111", protocol=FAX, and destination name="fax." In this case, the CPU 2001 adds the following entry to the destination list having the same structure as the address book in FIG. 14, closes the autocomplete screen (601), and displays the basic transmission screen (501).
{0x00000001,"fax","1111111",FAX,BPS33600,DOMESTIC,OFF ,,,}
This operation is similar to the operation described for the address book destination selection screen (502). This means that the basic transmission screen (501) makes no difference in operation regardless of whether the user selects a destination on the address book destination selection screen (502) or on the autocomplete screen (601).

Figure 18:
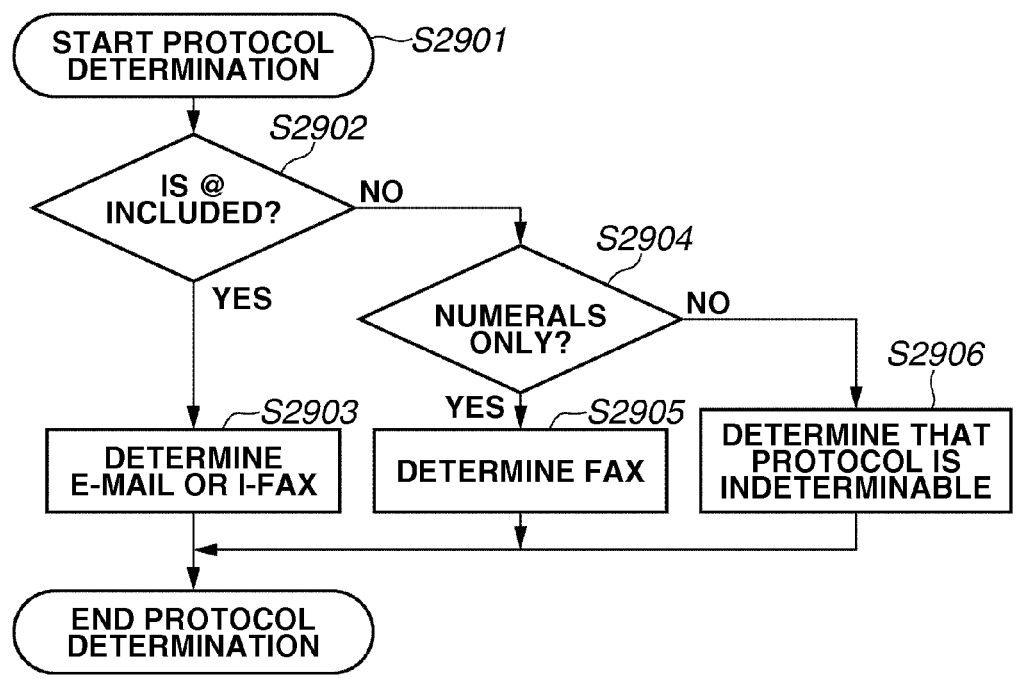
FIG. 18 is a flow chart illustrating protocol determination processing according to an exemplary embodiment of the present invention.

A case of the screen in FIG. 11C will be described below. The user can apply the input character string by pressing the "OK" button 6017. In this case, the acquired values include user-input character string="1234567890", candidate IndexID=NULL, and complementary character string=NULL. Based on this input character string, the CPU 2001 determines a communication protocol according to the determination flow chart illustrated in FIG. 18.

In step S2902, the CPU 2001 determines whether "@" is included in the character string. Since "@" is not included (NO in step S2902), the processing proceeds to step S2904. In step S2904, the CPU 2001 determines whether the character string includes only numerals. Since the character string includes only numerals (YES in step S2904), the CPU 2001 advances processing to step S2905 to determine a FAX protocol.

Based on the result of determination, the CPU 2001 displays the new Fax destination setting screen (504), and supplies the user-input character string to the FAX number setting portion 5041, as illustrated in FIG. 8. The user can apply the FAX number setting by pressing the "OK" button 5045. Subsequently, the CPU 2001 adds the following entry to the destination list having the same structure as the address book in FIG. 14, and displays the basic transmission screen (501).
{NULL ,,, "1234567890",FAX,BPS33600,DOMESTIC,ON ,,, }
IndexID=NULL means a new destination.

A case where a communication protocol is indeterminable will be described below. Referring to the screen in FIG. 12C, the user can apply the input character string by pressing the "OK" button. In this case, the acquired values include user-input character string="abc@abc.co.jp", candidate IndexID=NULL, and complementary character string=NULL. Based on this input character string, the CPU 2001 determines a communication protocol according to the determination flow chart illustrated in FIG. 18.

Figure 13:
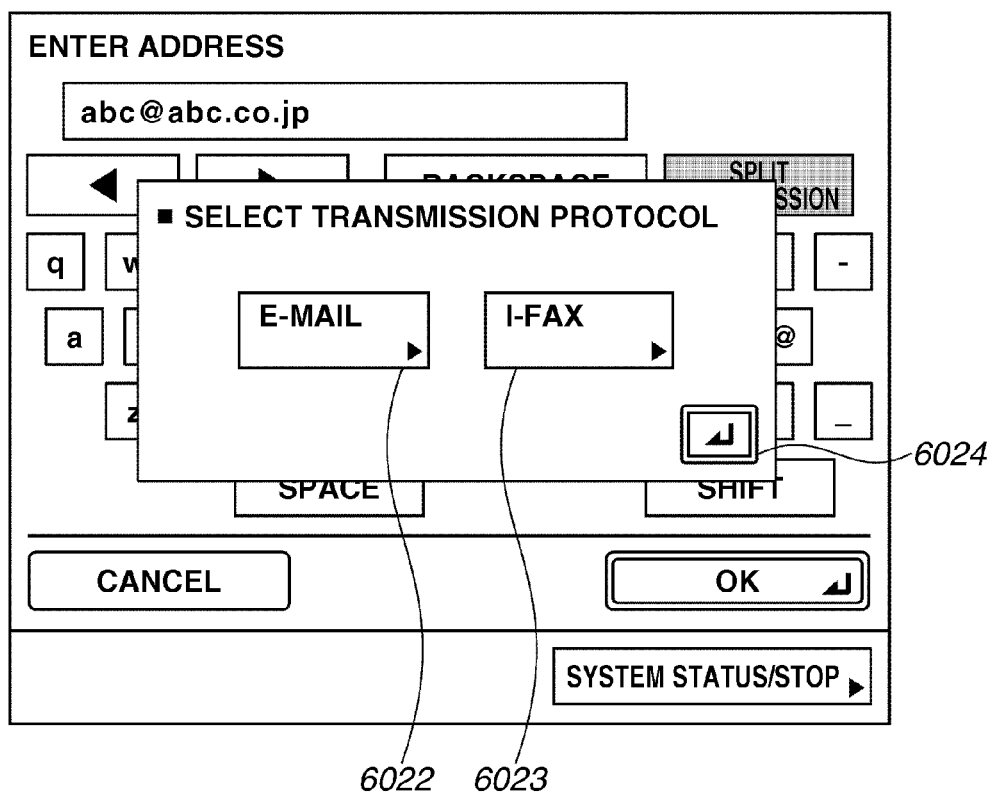
FIG. 13 illustrates an exemplary new destination protocol selection screen according to the first exemplary embodiment of the present invention.

In step S2902, the CPU 2001 first determines whether "@" is included in the character string. Since "@" is included in the input character string (YES in step S2902), the CPU 2001 advances processing to step S2903 to determine that the communication protocol is E-mail or i-Fax. Based on the result of determination, the CPU 2001 displays the new destination protocol selection screen 2 (602) as illustrated in FIG. 13. Then, the CPU 2001 waits for a user instruction, i.e., waits until the user presses any one of the "E-mail" button 6022, the "i-Fax" button 6023, and a button 6024. When the user presses the button 6024, the CPU 2001 closes the new destination protocol selection screen 2 (602) and returns processing to the screen illustrated in FIG. 12C. When the user presses the "E-mail" button 6022, the CPU 2011 displays the new E-mail destination setting screen (506) as illustrated in FIG. 9A based on the user instruction. Then, the CPU 2001 supplies the user-input character string to the mail address setting portion 5051 in the new E-mail destination setting screen (506). The user can apply the E-mail address setting by pressing the "OK" button 5054. In this case, the CPU 2001 adds the following entry to the destination list and displays the basic transmission screen (501).
{NULL,"abc@abc.co.jp",EMAIL,ON , , , }
When the user presses the "i-Fax" button 6023 in the screen illustrated in FIG. 13, the CPU 2001 displays the new i-Fax destination setting screen (507) as illustrated in FIG. 10A based on the user instruction. Then, the CPU 2001 supplies user-input character string to the i-Fax address setting portion 5061 in the new i-Fax destination setting screen (507). The user can apply the i-Fax address setting by pressing the "OK" button 5054. In this case, the CPU 2001 adds the following entry to the destination list and displays the basic transmission screen (501).
{NULL,"abc@abc.co.jp",IFAX,FULL,DEFAULT,DEFAULT,DEFAULT,DEF AULT}

As the last case, a case where a communication protocol is indeterminable will be described below. Suppose a case where the user-input character string is "123XX . . . " or the like. According to the determination flow chart illustrated in FIG. 18, the CPU 2001 advances processing to step S2902 to determine that "@" is not included in the input character string and then advances processing to step S2904. Since non-numeric characters are included in the input character string, the processing proceeds to step S2906, i.e., the CPU 2001 determines that a communication protocol is indeterminable. Based on the result of determination, the CPU 2001 displays again the autocomplete screen (601) to prompt the user to modify the input character string or add numbers or characters thereto, without making screen transition.

The above-mentioned exemplary embodiment enables simplifying address entered by the user by using any one of a plurality of communication protocols requiring attribute setting.

Figure 16:
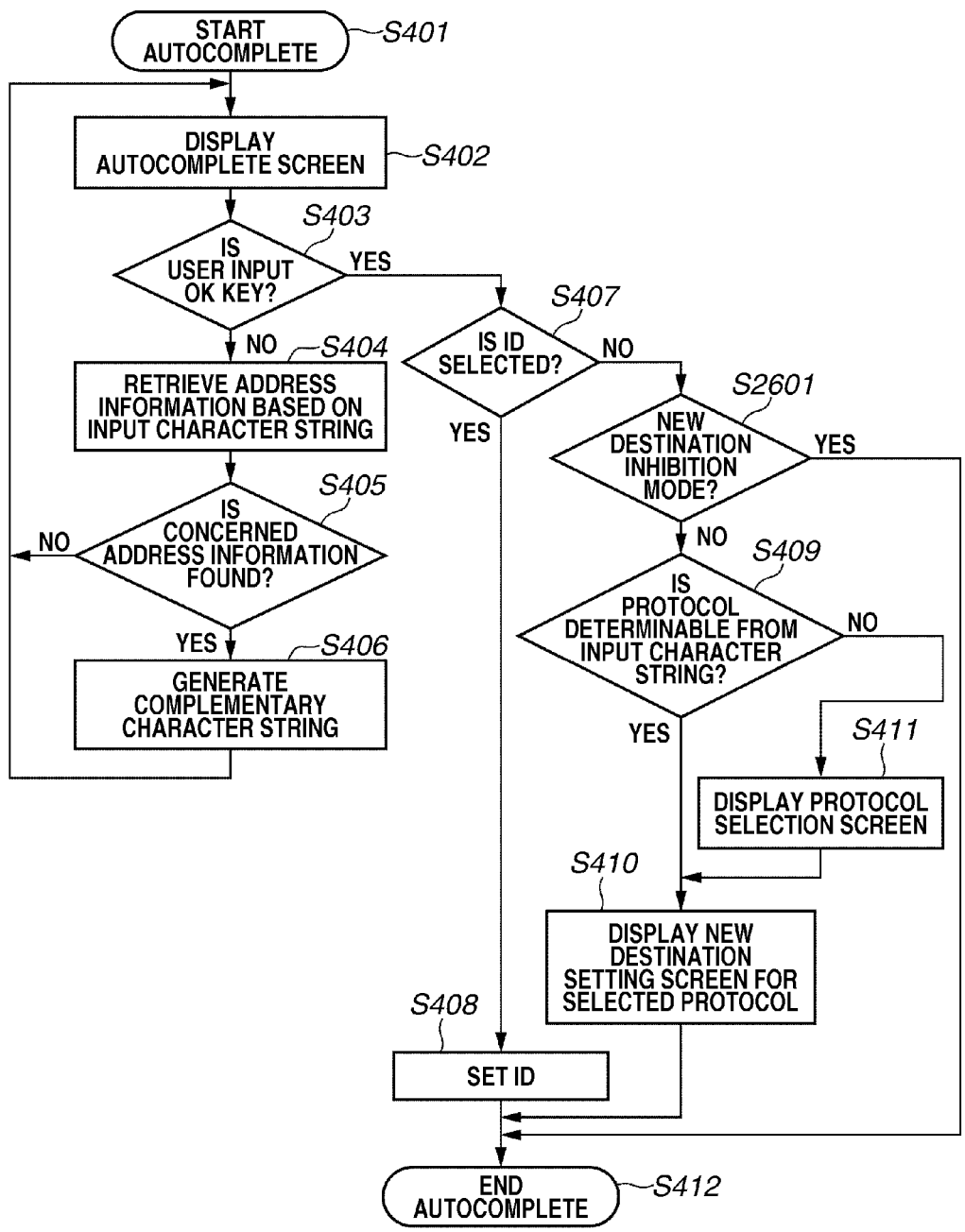
FIG. 16 is a flow chart illustrating autocomplete processing according to a second exemplary embodiment of the present invention.

A second exemplary embodiment of the present invention will be described based on a case where transmission to new destinations other than registered ones is inhibited. Descriptions will be made centering on a difference from the first exemplary embodiment. FIG. 16 illustrates a difference of the present exemplary embodiment from the first exemplary embodiment in addition to the flow chart thereof in FIG. 3. Specifically, determination processing in step S2601 is added. For the sake of description, a first inhibition mode in which transmission to new destinations other than registered ones is inhibited is referred to as new destination inhibition mode. The flow chart in FIG. 16 is implemented when the CPU 2001 loads a relevant program from the ROM 2003 to the RAM 2002 and then executes it.

When the CPU 2001 determines that the ID is not selected (NO in step S407), the CPU 2001 advances processing to step S2601 to determine whether the apparatus is in the new destination inhibition mode. When the CPU 2001 determines that the apparatus is in the new destination inhibition mode (YES in step S2601), the CPU 2001 advances processing to step S412 to end autocomplete. When the CPU 2001 determines that the apparatus is not in the new destination inhibition mode (NO in step S2601), the CPU 2001 advances processing to step S409 to return to a flow similar to the processing described in the first exemplary embodiment. When the CPU 2001 determines that the apparatus is in the new destination inhibition mode (YES in step S2601), the CPU 2001 may display again the autocomplete screen in step S402. When the CPU 2001 determines that the apparatus is not in the new destination inhibition mode (NO in step S2601), the CPU 2001 advances processing to step S409 to return to a flow similar to the processing described in the first exemplary embodiment. When a destination is specified in step S408 or S410, the CPU 2001 reads document data with the scanner 2070 and then transmits the read data to the specified destination in response to the transmission start instruction from the user. As data to be transmitted, the user may specify data prestored in the HDD 2004 before the user issues the transmission start instruction. In this case, when the user issues the transmission start instruction, the CPU 2001 transmits the specified data to the specified destination. When the CPU 2001 determines that the apparatus is in the new destination inhibition mode (YES in step S2601), the CPU 2001 performs control so as not to transmit data even when the CPU 2001 receives the transmission start instruction from the user. Thus, data transmission to a new destination can be prevented. Subsequently, when the user deletes a new destination, the CPU 2001 can perform control so as to remove restrictions on data transmission.

In this way, transmission to destinations other than registered ones can be inhibited. This enables providing a management function for destinations in addition to the effect of the present invention.

Figure 17:
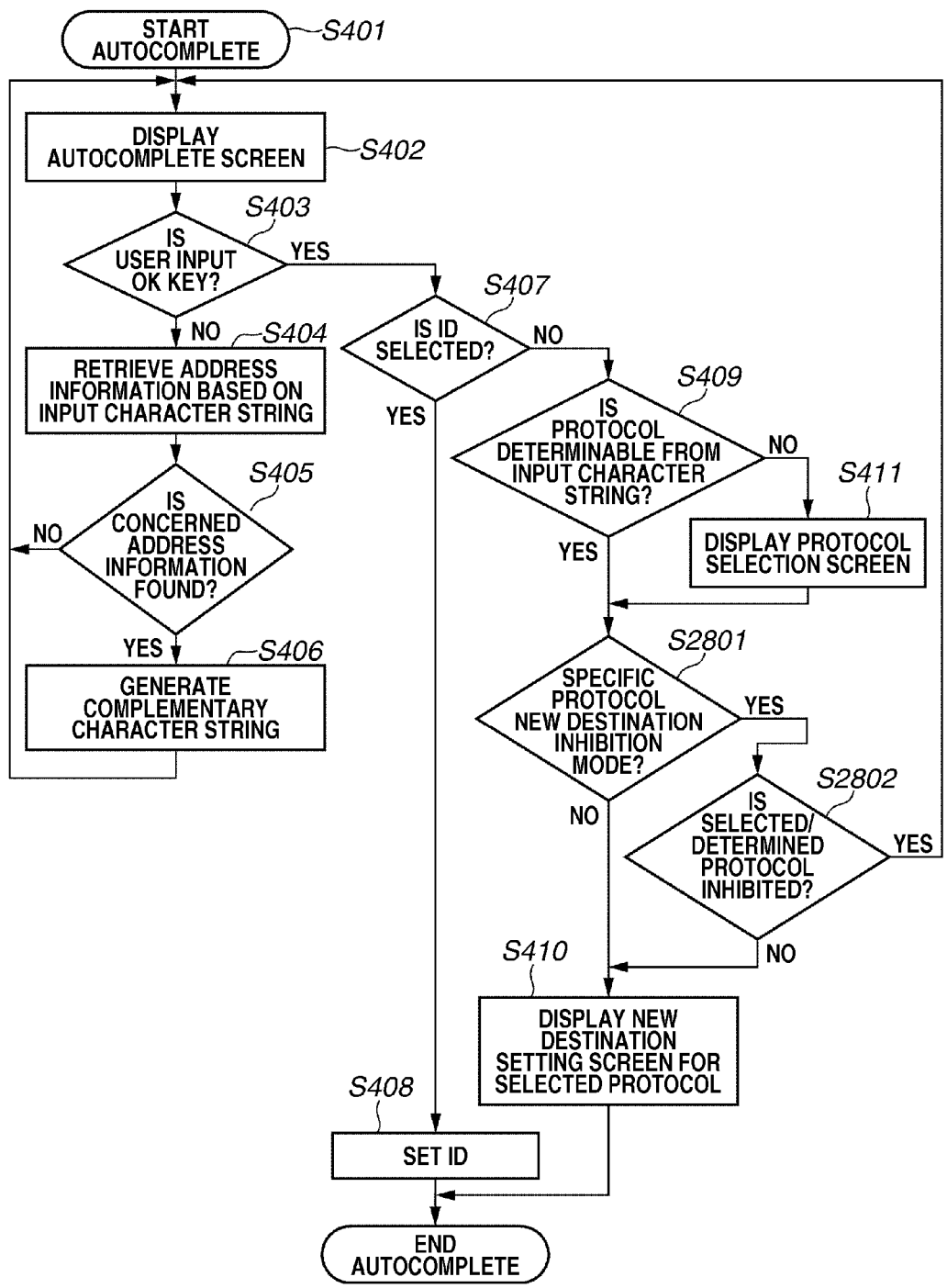
FIG. 17 is a flow chart illustrating autocomplete processing according to a third exemplary embodiment of the present invention.

A third exemplary embodiment of the present invention will be described based on a case where transmission to new destinations other than registered ones is inhibited for a specific communication protocol. Descriptions will be made centering on a difference from the first exemplary embodiment. FIG. 17 illustrates a difference of the present exemplary embodiment from the first exemplary embodiment in addition to the flow chart thereof in FIG. 3. Specifically, processing in steps S2801 and S2802 is added. For the sake of description, a second inhibition mode in which transmission to new destinations other than registered ones is inhibited for the specific communication protocol is referred to as specific protocol new destination inhibition mode. The flow chart in FIG. 17 is implemented when the CPU 2001 loads a relevant program from the ROM 2003 to the RAM 2002 and then executes it.

After determining that a communication protocol is determinable from the input character string (YES in step S409), or after determining that a communication protocol is indeterminable (NO in step S409) and displaying in step S411 the protocol selection screen to allow the user to select a communication protocol, the CPU 2001 advances processing to step S2801 to determine whether the apparatus is in the specific protocol new destination inhibition mode. When the apparatus is in the specific protocol new destination inhibition mode (YES in step S2801), the CPU 2001 advances processing to step S2802 to determine whether the communication protocol determined in step S409 or the communication protocol selected in the protocol selection screen by the user in step S411 is the specific communication protocol. When the CPU 2001 determines that the determined/selected communication protocol is the specific communication protocol (YES in step S2802), the CPU 2001 returns processing to step S402 to display the autocomplete screen again. When the CPU 2001 determines that the apparatus is not in the new destination inhibition mode (NO in step S2801), or when the CPU 2001 determines that the determined/selected communication protocol is not the specific communication protocol (NO in step S2802), the CPU 2001 advances processing to step S410 to display the new destination setting screen for the selected communication protocol and then return to a flow similar to the processing described in the first exemplary embodiment. When a destination is specified in step S408 or S410, the CPU 2001 reads document data with the scanner 2070 and then transmits the read data to the specified destination in response to the transmission start instruction from the user. As data to be transmitted, the user may specify data prestored in the HDD 2004 before the user issues the transmission start instruction. In this case, when the user issues the transmission start instruction, the CPU 2001 transmits the specified data to the specified destination. When the CPU 2001 determines that the apparatus is in the specific protocol new destination inhibition mode (YES in step S2801) and determines that the determined/selected communication protocol is the specific communication protocol (YES in step S2802), the CPU 2001 performs control so as not to transmit data even when the CPU 2001 receives the transmission start instruction from the user. Thus, data transmission to a new destination can be prevented. Subsequently, when the user deletes a destination determined to be a new destination for the specific communication protocol, the CPU 2001 performs control so as to remove restrictions on data transmission.

In this way, transmission to destinations other than registered ones can be inhibited for the specific communication protocol. This enables providing a management function for destinations in addition to the effect of the present invention.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-219766 filed Sep. 24, 2009, which is hereby incorporated by reference herein in its entirety.

What is claimed is:

1. An image processing apparatus capable of transmitting image data using one of at least first and second communication protocols, the image processing apparatus comprising:
   a reading unit configured to read image data from an original;
   a holding unit configured to hold destination information indicating a destination corresponding to the first communication protocol and destination information indicating a destination corresponding to the second communication protocol;
   an input unit configured to allow a user to input at least one character to indicate a destination of the image data to be transmitted;
   a retrieving unit configured to retrieve the destination information which includes the at least one character from the destination information which is held by the holding unit;
   a determining unit configured to the destination information retrieved by the retrieving unit as a destination of the image data and determine one of the first and second communication protocols which corresponds to the retrieved destination information as a communication protocol used for transmitting the image data; and
   a display unit configured to display, in a case where the destination information which includes the at least one character is not found by the retrieving unit, a protocol selection screen for selecting a communication protocol used for transmitting the image data.

2. The image processing apparatus according to claim 1, wherein the first and second communication protocols include at least two of facsimile, E-mail, and Internet facsimile.

3. The image processing apparatus according to claim 1, wherein the display unit is further configured to display the at least one character input by the user and a character string following the at least one character based on the destination information which is held by the holding unit and is retrieved by the retrieving unit.

4. The image processing apparatus according to claim 3, wherein the display unit displays information indicating one of the first and second communication protocols which corresponds to the retrieved destination information.

5. The image processing apparatus according to claim 1, further comprising:
   wherein the determining unit is further configured to determine destination information which is not found by the retrieving unit and is indicated by the input at least one character, and determine the communication protocol via the displayed protocol selection screen which is selected by the user after the at least one character is input by the input unit as the communication protocol used for transmitting the image data.

6. The image processing apparatus according to claim 1, wherein the display unit is further configured to display, if the destination information indicating respective destinations is found by the retrieving unit, destination candidates including the destination information found by the retrieving unit,
   wherein the determining unit determines the destination information selected from the destination candidates as the destination of the image data, and determines the protocol information corresponding to the selected destination information as the communication protocol used for transmitting the image data.

7. The image processing apparatus according to claim 1, wherein the display unit is further configured to display the destination information which is held by the holding unit and is retrieved by the retrieving unit.

8. The image processing apparatus according to claim 1, wherein the holding unit is configured to hold the destination information indicating the destination and protocol information indicating one of the first and second communication protocols which corresponds to the destination.

9. The image processing apparatus according to claim 1, further comprising:

a transmitting unit configured to transmit the image data to the destination determined by the determining unit using the communication protocol determined by the determining unit.

10. A control method for controlling an image processing apparatus capable of transmitting image data using one of at least first and second communication protocols, the method comprising:
   reading image data from an original;
   holding, in a holding unit, destination information indicating a destination corresponding to the first communication protocol and destination information indicating a destination corresponding to the second communication protocol;
   allowing a user to input at least one character to indicate a destination of the image data to be transmitted;
   retrieving the destination information which includes the at least one character from the destination information which is held by the holding unit;
   determining the retrieved destination information as a destination of the image data;
   determining one of the first and second communication protocols which corresponds to the retrieved destination information as a communication protocol used for transmitting the image data; and
   displaying, in a display unit, in a case where the retrieved destination information which includes the at least one character is not found a protocol selection screen for selecting a communication protocol used for transmitting the image data.

11. A non-transitory computer-readable storage medium storing a computer program for controlling an image processing apparatus capable of transmitting image data using one of first and second communication protocols, the computer program comprising:
   a code to cause a reading unit to read image data from an original;
   a code to hold, in a holding unit, destination information indicating a destination corresponding to the first communication protocol and destination information indicating a destination corresponding to the second communication protocol;
   a code to allow a user to input at least one character to indicate a destination of image data to be transmitted;
   a code to retrieve the destination information which includes the at least one character from the destination information which is held by the holding unit;
   a code to determine the retrieved destination information as a destination of the image data and determine one of the first and second communication protocols which corresponds to the retrieved destination information as a communication protocol used for transmitting the image data; and
   a code to display, in a display unit, in a case where the retrieved destination information which includes the at least one character is not found, a protocol selection screen for selecting a communication protocol used for transmitting the image data.

12. An image processing apparatus capable of transmitting image data using one of at least first and second communication protocols, the image processing apparatus comprising:
   a reading unit configured to read image data from an original;
   a holding unit configured to hold destination information indicating a destination corresponding to the first communication protocol and destination information indicating a destination corresponding to the second communication protocol;
   an input unit configured to allow a user to input at least one character to indicate a destination of the image data to be transmitted; and
   a retrieving unit configured to retrieve the destination information which includes the at least one character from the destination information which is held by the holding unit;
   a determining unit configured to the destination information retrieved by the retrieving unit as a destination of the image data and determine one of the first and second communication protocols which corresponds to the retrieved destination information as a communication protocol used for transmitting the image data,
   wherein the determining unit is further configured to determine destination information which is not found by the retrieving unit and is indicated by the input at least one character, and determine the communication protocol used for transmitting the image data from the destination information which is not found by the retrieving unit and is indicated by the input at least one character.

13. The image processing apparatus according to claim 12, wherein the determining unit determines whether "@" is included in the at least one character which has been input by the user, and determines E-mail or Internet facsimile as the communication protocol used for transmitting the image data if it is determined that "@" is included.

14. The image processing apparatus according to claim 13, further comprising:
   a display unit configured to display a protocol selection screen to allow the user to select E-mail or Internet facsimile,
   wherein the determining unit determines E-mail or Internet facsimile selected by the user as the communication protocol used for transmitting the image data if it is determined that "@" is included.

15. The image processing apparatus according to claim 12, wherein the determining unit determines whether the destination information indicated by the at least one character which has been input by the user includes only numerals, and determines facsimile as the communication protocol used for transmitting the image data if it is determined that the destination information includes only numerals.

16. An image processing apparatus capable of transmitting image data using one of at least first and second communication protocols, the image processing apparatus comprising:
   a reading unit configured to read image data from an original;
   a holding unit configured to hold destination information indicating a destination corresponding to the first communication protocol and destination information indicating a destination corresponding to the second communication protocol;
   an input unit configured to allow a user to input at least one character to indicate a destination of the image data to be transmitted;
   a retrieving unit configured to retrieve the destination information which includes the at least one character from the destination information which is held by the holding unit;
   a determining unit configured to the destination information retrieved by the retrieving unit as a destination of the image data and determine one of the first and second communication protocols which corresponds to the retrieved destination information as a communication protocol used for transmitting the image data; and a mode determining unit configured to determine whether the image processing apparatus is a new destination inhibition mode in which transmission to a destination indicated by destination information not held by the holding unit is inhibited, wherein, if the destination information which includes the at least one character is not found by the retrieving unit and the image processing apparatus is the new destination inhibition mode, the image data is not transmitted to a destination indicated by destination information not held by the holding unit.

17. An image processing apparatus capable of transmitting image data using one of at least first and second communication protocols, the image processing apparatus comprising:

a holding unit configured to hold destination information indicating a destination corresponding to the first communication protocol and destination information indicating a destination corresponding to the second communication protocol;

an input unit configured to allow a user to input at least character to indicate a destination of image data to be transmitted;

a retrieving unit configured to retrieve the destination information which includes the at least one character from the destination information hold by the holding unit;

a first determining unit configured to determine the destination retrieved by the retrieving unit as a destination of the image data and determine one of the first and second communication protocols which corresponds to the retrieved destination information as a communication protocol used for transmitting the image data; and a second determining unit configured to allow the user to select one of the first and second communication protocols after the at least one character is input by the input unit, determine destination information which is not found by the retrieving unit and is indicated by the input at least one character as a destination of the image data, and determine one of the first and second communication protocols which is selected by the user after the at least one character is input by the input unit as a communication protocol used for transmitting the image data.

18. The image processing apparatus according to claim 17, further comprising:

a display unit configured to display a protocol selection screen for selecting one of the first and second communication protocols, wherein the second determining unit is configured to determine one of the first and second communication protocols which is selected on the protocol selection screen as the communication protocol used for transmitting the image data.

19. The image processing apparatus according to claim 17, wherein the first and second communication protocols include at least two of facsimile, E-mail, and Internet facsimile.

20. The image processing apparatus according to claim 17, further comprising:

a display unit configured to display the at least one character input by the user and a character string following the at least one character based on the destination information which is held by the holding unit and is retrieved by the retrieving unit.

21. The image processing apparatus according to claim 20, wherein the display unit is further configured to display information indicating one of the first and second communication protocols which corresponds to the retrieved destination information.

22. The image processing apparatus according to claim 17, wherein the second determining unit is configured to determine one of the first and second communication protocols, as a communication protocol used for transmitting the image data, based on the input at least one character, and determine one of the first and second communication protocols which is selected by the user as the communication protocol used for transmitting the image data if the communication protocol is not determined based on the input at least one character.

23. The image processing apparatus according to claim 17, wherein the holding unit is configured to hold the destination information indicating the destination and protocol information indicating one of the first and second communication protocols which corresponds to the destination.

24. The image processing apparatus according to claim 17, further comprising:

a transmitting unit configured to transmit the image data to the destination determined by the first or second determining unit using the communication protocol determined by the first or second determining unit.

25. An image processing apparatus capable of transmitting image data using one of at least first and second communication protocols, the image processing apparatus comprising:

a holding unit configured to hold destination information indicating a destination corresponding to the first communication protocol and destination information indicating a destination corresponding to the second communication protocol;

an input unit configured to allow a user to input at least character to indicate a destination of image data to be transmitted;

a retrieving unit configured to retrieve the destination information which includes the at least one character from the destination information hold by the holding unit;

a first determining unit configured to determine the destination retrieved by the retrieving unit as a destination of the image data and determine one of the first and second communication protocols which corresponds to the retrieved destination information as a communication protocol used for transmitting the image data; and a second determining unit configured to determine destination information which is not found by the retrieving unit and is indicated by the input at least one character as a destination of the image data, and determine one of the first and second communication protocols, as a communication protocol used for transmitting the image data, based on the input at least one character.

26. The image processing apparatus according to claim 25, wherein the first and second communication protocols include at least two of facsimile, E-mail, and Internet facsimile.

27. The image processing apparatus according to claim 25, further comprising:

a display unit configured to display the at least one character input by the user and a character string following the at least one character based on the destination information which is held by the holding unit and is retrieved by the retrieving unit.

28. The image processing apparatus according to claim 27, wherein the display unit is further configured to display information indicating one of the first and second communication protocols which corresponds to the retrieved destination information.

29. The image processing apparatus according to claim 25, wherein the holding unit is configured to hold the destination information indicating the destination and protocol information indicating one of the first and second communication protocols which corresponds to the destination.

30. The image processing apparatus according to claim 25, further comprising:
 a transmitting unit configured to transmit the image data to the destination determined by the first or second determining unit using the communication protocol determined by the first or second determining unit.

* * * * *